US010181752B2

(12) United States Patent
Takemura et al.

(10) Patent No.: US 10,181,752 B2
(45) Date of Patent: Jan. 15, 2019

(54) CONTROL APPARATUS, CONTROL METHOD, AND PROGRAM

(71) Applicant: Sony Corporation, Tokyo (JP)

(72) Inventors: Kazuyoshi Takemura, Tokyo (JP); Satoshi Konya, Kanagawa (JP)

(73) Assignee: Sony Corporation, Tokyo (JP)

( * ) Notice: Subject to any disclaimer, the term of this patent is extended or adjusted under 35 U.S.C. 154(b) by 372 days.

(21) Appl. No.: 14/761,040

(22) PCT Filed: Oct. 30, 2013

(86) PCT No.: PCT/JP2013/079373
§ 371 (c)(1),
(2) Date: Jul. 15, 2015

(87) PCT Pub. No.: WO2014/115392
PCT Pub. Date: Jul. 31, 2014

(65) Prior Publication Data
US 2015/0333569 A1 Nov. 19, 2015

(30) Foreign Application Priority Data
Jan. 22, 2013 (JP) ................. 2013-009144

(51) Int. Cl.
H02J 7/00 (2006.01)
H02J 9/00 (2006.01)
(Continued)

(52) U.S. Cl.
CPC ............... H02J 9/04 (2013.01); G08C 17/00 (2013.01); H02J 1/10 (2013.01); H02J 9/061 (2013.01); H04B 3/54 (2013.01); Y10T 307/625 (2015.04)

(58) Field of Classification Search
CPC ..... H02J 9/061; H02J 1/10; H02J 9/04; H04B 3/54; Y10T 307/625
See application file for complete search history.

(56) References Cited

U.S. PATENT DOCUMENTS

2004/0164849 A1* 8/2004 Alvarez ................. H04L 12/66
340/2.9
2006/0145535 A1* 7/2006 Kaneko ..................... H04B 3/54
307/1
(Continued)

FOREIGN PATENT DOCUMENTS

JP 2008-199250 A 8/2008
JP 2011-083051 A 4/2011
(Continued)

Primary Examiner — Rexford Barnie
Assistant Examiner — Rasem Mourad
(74) Attorney, Agent, or Firm — Wolf, Greenfield & Sacks, P.C.

(57) ABSTRACT

There is provided a control apparatus including: a determination unit configured to determine whether a control target apparatus drivable with first power supplied from an external power supply and second power supplied from a battery is driven with the second power, on the basis of a supply state of the first power and a transmission signal acquired via a power line from an external communication apparatus connected to the power line through which the first power is transmitted; and a target control unit configured to drive the control target apparatus with the second power when the control target apparatus is determined to be driven with the second power.

9 Claims, 11 Drawing Sheets

(51) Int. Cl.
*H02J 9/04* (2006.01)
*H04B 3/54* (2006.01)
*H02J 9/06* (2006.01)
*G08C 17/00* (2006.01)
*H02J 1/10* (2006.01)

(56) References Cited

U.S. PATENT DOCUMENTS

| | | | |
|---|---|---|---|
| 2010/0001687 A1* | 1/2010 | Watanabe | B60L 3/12 |
| | | | 320/109 |
| 2010/0141046 A1* | 6/2010 | Paik | H02J 3/14 |
| | | | 307/126 |
| 2011/0161687 A1 | 6/2011 | Tajima | |
| 2011/0309747 A1* | 12/2011 | Michaud | H05B 37/0281 |
| | | | 315/86 |
| 2013/0101054 A1* | 4/2013 | Chen | H04B 3/542 |
| | | | 375/257 |
| 2013/0138367 A1* | 5/2013 | Boivin | G01R 31/08 |
| | | | 702/59 |
| 2014/0100671 A1* | 4/2014 | Losee | H02J 3/14 |
| | | | 700/22 |

FOREIGN PATENT DOCUMENTS

| | | |
|---|---|---|
| JP | 2011-135749 A | 7/2011 |
| JP | 2012-235614 A | 11/2012 |
| JP | 2012-235615 A | 11/2012 |
| WO | WO 2011-039601 A1 | 4/2011 |

\* cited by examiner

FIG. 1
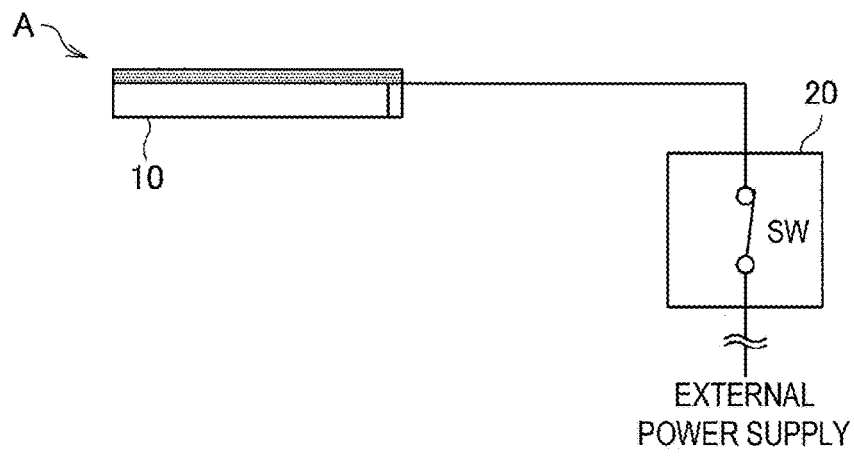
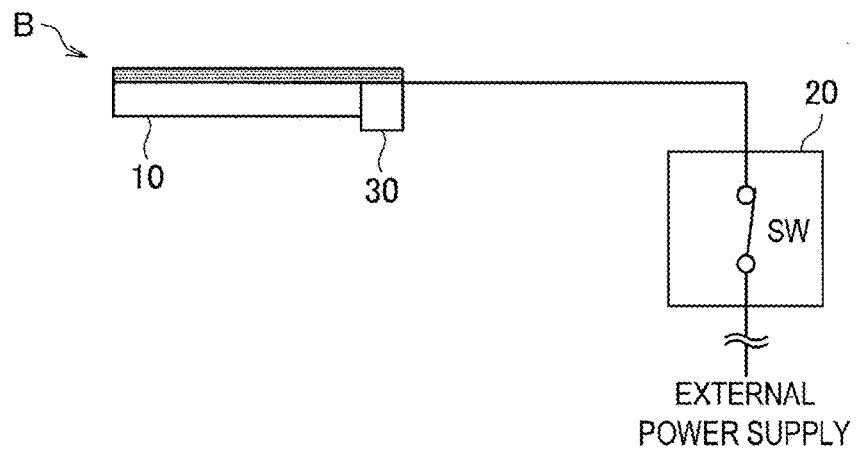
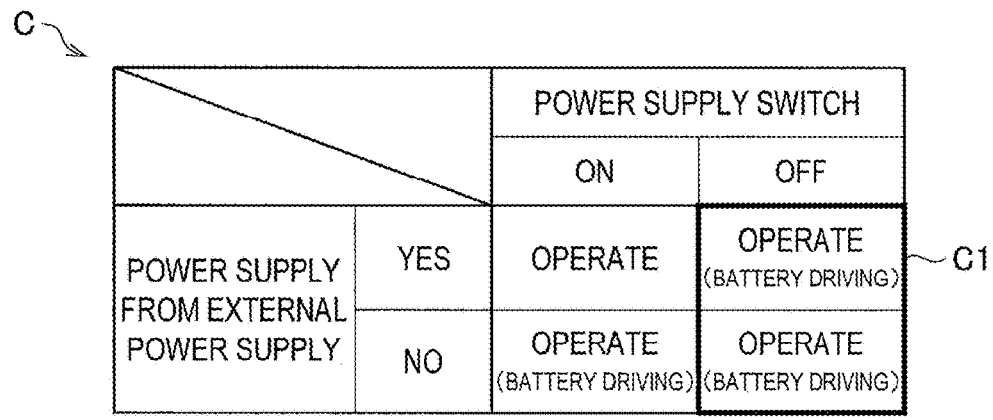

CONTROL APPARATUS, CONTROL METHOD, AND PROGRAM

CROSS REFERENCE TO RELATED APPLICATIONS

This application claims the benefit under 35 U.S.C. § 371 as a U.S. National Stage Entry of International Application No. PCT/JP2013/079373, filed in the Japanese Patent Office as a Receiving Office on Oct. 30, 2013, which claims priority to Japanese Patent Application No. JP 2013-009144, filed in the Japanese Patent Office on Jan. 22, 2013, each of which is hereby incorporated by reference in its entirety.

TECHNICAL FIELD

The present disclosure relates to a control apparatus, a control method, and a program.

BACKGROUND ART

For example, apparatuses which can be driven with power supplied from external power supplies such as commercial power supplies and power supplied from batteries serving as auxiliary power supplies have appeared. When the apparatuses are configured to be drivable with power supplied from batteries, the apparatuses can be drive even during emergencies in which power normally supplied from external power supplies is not supplied to the apparatuses, for example, during a power failure.

Technologies for controlling operations of apparatuses through communication via power lines have been developed. An example of a technology for controlling an operation of an illuminator through communication via a power line includes a technology disclosed in Patent Literature 1.

CITATION LIST

Patent Literature

Patent Literature 1: JP 2008-199250A

SUMMARY OF INVENTION

Technical Problem

For example, existing apparatuses configured to be drivable with power supplied from batteries (hereinafter simply referred to as existing apparatuses) can be driven with power supplied from batteries even during emergencies in which power normally supplied from external power supplies is not supplied, such as during a power failure.

However, in the existing apparatuses, it may be difficult to discriminate causes of situations in which power supplied from external power supplies is not supplied between emergency states such as a a power failure and disconnection of power lines and normal states such as when power switches are off. Accordingly, when the existing apparatuses are used, undesirable states in which the existing apparatuses are driven with power supplied from batteries, for example, at normal times at which power switches are turned off may occur.

For example, in Patent Literature 1, undesirable states which can occur in the existing apparatuses were not particularly considered. Even when the technology disclosed in, for example, Patent Literature 1 is used, the undesirable states which can occur in the existing apparatuses can occur.

It is desirable to provide a novel and improved control apparatus, a novel and improved control method, and a novel and improved program capable of controlling driving with second power on a control target apparatus which is configured to be drivable with first power supplied from an external power supply and the second power supplied from a battery.

Solution to Problem

According to the present disclosure, there is provided a control apparatus including: a determination unit configured to determine whether a control target apparatus drivable with first power supplied from an external power supply and second power supplied from a battery is driven with the second power, on the basis of a supply state of the first power and a transmission signal acquired via a power line from an external communication apparatus connected to the power line through which the first power is transmitted; and a target control unit configured to drive the control target apparatus with the second power when the control target apparatus is determined to be driven with the second power.

According to the present disclosure, there is provided a control method including: a step of determining whether a control target apparatus drivable with first power supplied from an external power supply and second power supplied from a battery is driven with the second power, on the basis of a supply state of the first power and a transmission signal acquired via a power line from an external communication apparatus connected to the power line through which the first power is transmitted; and a step of driving the control target apparatus with the second power when the control target apparatus is determined to be driven with the second power.

According to the present disclosure, there is provided a program causing a computer to perform: a step of determining whether a control target apparatus drivable with first power supplied from an external power supply and second power supplied from a battery is driven with the second power, on the basis of a supply state of the first power and a transmission signal acquired via a power line from an external communication apparatus connected to the power line through which the first power is transmitted; and a step of driving the control target apparatus with the second power when the control target apparatus is determined to be driven with the second power.

Advantageous Effects of Invention

According to an embodiment of the present disclosure, it is possible to control driving with the second power in the control target apparatus which is configured to be drivable with the first power supplied from an external power supplied and the second power supplied from a battery.

BRIEF DESCRIPTION OF DRAWINGS

FIG. 1 is an explanatory diagram illustrating an example of a problem which can occur when an existing apparatus is used.

BRIEF DESCRIPTION OF DRAWINGS

Figure 2:
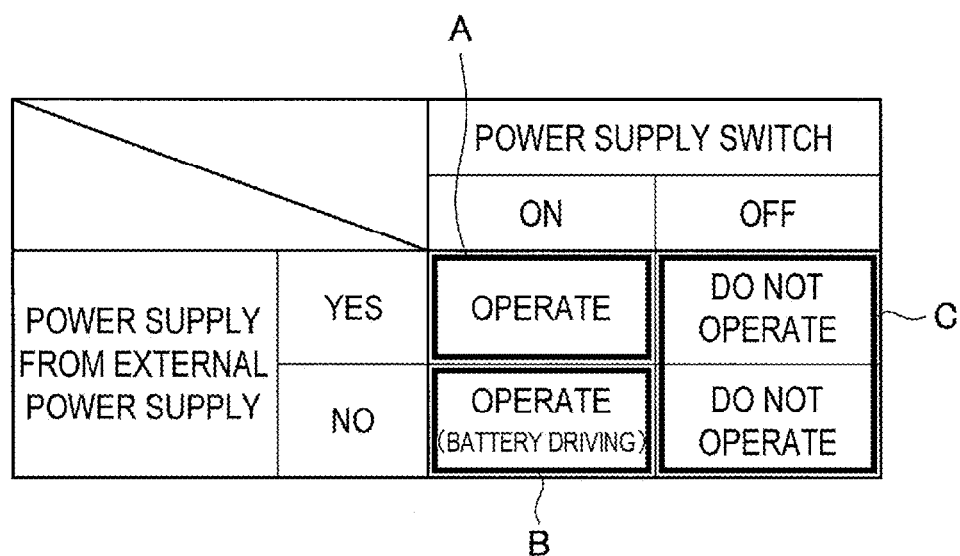
FIG. 2 is an explanatory diagram illustrating an example of an operation of a control target apparatus according to an embodiment of which driving is controlled with second power by a control apparatus according to the embodiment.

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

Hereinafter, the description will be made in the following order.

1. Control method according to embodiment
2. Control system according to embodiment
3. Program according to embodiment (Control Method According to Embodiment)

Before the configuration of each apparatus included in a control system according to an embodiment, a control method according to the embodiment will be first descried. Hereinafter, the control method according to the embodiment will be described exemplifying a case in which a control apparatus according to the embodiment included in the control system according to the embodiment performs a process related to the control method according to the embodiment.

Hereinafter, power supplied from an external power supply such as a commercial power supply is referred to as "first power" and power supplied from a battery is referred to as "second power." Here, an external power supply according to the embodiment serves as, for example, a power supply supplying power to an apparatus at a normal time, and a battery according to the embodiment serves as, for example, an auxiliary power supply. Examples of the first power according to the embodiment include alternating current (AC) power and direct current (DC) power.

[I] Example of Problem which can Occur when Existing Apparatus is Used

In existing apparatuses, as described above, it may be difficult to discriminate causes of situations in which the first power supplied from external power supplies is not supplied between emergency states such as a power failure and disconnection of power lines and normal states such as when power switches are off. For this reason, when the existing apparatuses are used, undesirable states in which the existing apparatuses are driven with the second power supplied from batteries, for example, at normal times in which power switches are turned off, may occur.

FIG. 1 is an explanatory diagram illustrating an example of a problem which can occur when an existing apparatus is used. An apparatus 10 driven with supplied power, a switching apparatus 20 in which a power supply switch SW selectively supplies the first power delivered from an external power supply to the apparatus 10 by the power supply switch SW, and a battery 30 are illustrated In FIG. 1. A part A illustrated in FIG. 1 shows an example of the apparatus 10 driven with the first power selectively supplied by turning the power supply switch SW in the switching apparatus 20 on and off. A part B illustrated in FIG. 1 shows an example of the apparatus 10 (existing apparatus) driven with the first power selectively supplied through ON and OFF of the power supply switch SW in the switching apparatus 20 and the second power supplied from the battery 30. A part C illustrated in FIG. 1 shows examples of operation states in the existing apparatus 10 shown in part B of FIG. 1. In the part C illustrated in FIG. 1, driving with the second power supplied from the battery 30 is referred to as "battery driving."

For example, the apparatus 10 shown in the part A of FIG. 1 is driven with only the supplied first power. Therefore, when the power supply switch SW in the switching apparatus 20 is turned on, the apparatus 10 operates. When the power supply switch SW in the switching apparatus 20 is turned off, the apparatus 10 does not operate.

On the other hand, for example, the existing apparatus 10 shown in the part part B of FIG. 1 can be driven with the supplied first power and the second power supplied from the battery 30. Therefore, even when the first power is not supplied, the existing apparatus 10 can be driven with the second power. However, for example, in the existing apparatus 10 shown in the part B of FIG. 1, it may be difficult to discriminate a cause of the situation in which the first power is not supplied between a case in which the power supply switch SW of the switching apparatus 20 is off and an emergency state such as a power failure or disconnection of a power line.

For this reason, for example, when the existing apparatus 10 shown in the part B of FIG. 1 is used, for example, as shown in C1 of the part C of FIG. 1, the existing apparatus 10 may be driven with the second power supplied from the battery 30, for example, even when the power supply switch SW of the switching apparatus 20 is turned off. As a specific example, for example, when the existing apparatus 10 is an illuminator, lighting continues until the second power is not supplied from the battery 30, even if a user performs a manipulation of turning off the power supply switch SW of the switching apparatus 20.

Accordingly, for example, when the existing apparatus 10 shown in the part B of FIG. 1 is used, an undesirable state, for example, a state in which "the existing apparatus 10 continues to be driven until the second power is not supplied from the battery 30, even if the user performs a manipulation of turning off the power supply switch SW of the switching apparatus 20," can occur.

Accordingly, for example, when the existing apparatus 10 shown in the part B of FIG. 1 is used, there is a concern of convenience for the user being degraded.

[II] Process Related to Control Method According to Embodiment

Accordingly, the control apparatus according to the embodiment determines whether an apparatus which can be driven with the first power supplied from an external power supply and the second power supplied from a battery is driven with the second power (determination process) and drives the apparatus with the second power based on a determination result (target control process). Hereinafter, a target apparatus of which driving with the second power is controlled by the control apparatus according to the embodiment is referred to as a "control target apparatus."

(1) Determination Process

The control apparatus according to the embodiment determines whether the control target apparatus is driven with the second power based on a supply state of the first power to the control target apparatus and a transmission signal acquired via a power line from an external communication apparatus connected to a power line through which the first power is supplied.

Here, the control apparatus according to the embodiment specifies a supply state of the first power to the control target apparatus, for example, by acquiring a signal indicating the supply state of the first power to the control target apparatus from the control target apparatus. For example, the control apparatus according to the embodiment transmits a request to transmit the signal indicating the supply state of the first power to the control target apparatus, so that the control apparatus according to the embodiment acquires the signal indicating the supply state of the first power from the control target apparatus. The method of acquiring the signal indicating the supply state of the first power according to the embodiment is not limited thereto. For example, the control apparatus according to the embodiment may acquire the signal indicating the supply state of the first power by receiving the signal transmitted periodically or aperiodically from the control target apparatus and indicating the supply state of the first power.

For example, the external communication apparatus according to the embodiment is connected to a power line via a power supply switch selectively supplying the control target apparatus with the first power delivered from an external power supply from the viewpoint of the control target apparatus. When the external communication apparatus is connected to the power line via the power supply switch from the viewpoint of the control target apparatus, the control apparatus according to the embodiment can specify whether the power supply switch is on or off, for example, based on an acquisition state of a transmission signal acquired from the external communication apparatus via the power line.

The external communication apparatus according to the embodiment is not limited to the case in which the external communication apparatus is connected to the power line via the power supply switch. For example, the external communication apparatus according to the embodiment may be further connected to, for example, a power line without interposing a power supply switch from the viewpoint of the control target apparatus. When the external communication apparatus is connected to the above-described power line, in the embodiment, for example, whether the power line is disconnected can be specified, for example, based on an acquisition state of a transmission signal acquired from the external communication apparatus via the power line. An example of a control system capable of specifying line disconnection according to the embodiment will be described below.

The control apparatus according to the embodiment acquires the transmission signal from the external communication apparatus, for example, by causing a communication unit (which will be described below) (or an external communication device having the same function or configuration as the communication unit (which will be described below) and the same applies below) to communicate with the external communication apparatus via the power line. The control apparatus according to the embodiment acquires the transmission signal from the external communication apparatus, for example, by causing the communication unit (which will be described below) to transmit a signal for causing the transmission signal to be transmitted and causing the external communication apparatus to transmit the transmission signal.

Here, examples of the signal for causing the transmission signal according to the embodiment to be transmitted include a signal including a transmission request to transmit the transmission signal and a polling signal.

An example of the transmission signal transmitted by the external communication apparatus according to the embodiment includes a signal indicating a response to the transmission request or the polling signal.

The transmission signal transmitted by the external communication apparatus according to the embodiment is not limited thereto. For example, the transmission signal transmitted by the external communication apparatus according to the embodiment may be a signal including identification information indicating the external communication apparatus. Here, the identification information according to the embodiment is information used to identify the external communication apparatus. Examples of the identification information according to the embodiment include data indicating an identification number unique to the external communication apparatus and data (for example, data indicating a maker or a model number) indicating a kind of external communication apparatus. The identification information according to the embodiment is not limited to the foregoing examples as long as the identification information is information which can be used to identify the external communication apparatus.

When the transmission signal transmitted by the external communication apparatus according to the embodiment is a signal including the identification information, the control apparatus according to the embodiment can specify the external communication apparatus transmitting the transmission signal based on the identification information included in the acquired transmission signal. Accordingly, in the control system according to the embodiment, even when signals transmitted from a plurality of apparatuses in power lines are transmitted, the control apparatus according to the embodiment can perform a process related to the control method according to the embodiment based on the transmission signal transmitted from a specific external communication apparatus.

More specifically, the control apparatus according to the embodiment does not determine that the control target apparatus is driven with the second power, for example, when the first power is supplied to the control target apparatus.

The control apparatus according to the embodiment determines whether the control target apparatus is driven with the second power based on an acquisition state of the transmission signal, for example, when the first power is not supplied to the control target apparatus.

Here, the control apparatus according to the embodiment determines that the control target apparatus is driven with the second power, for example, when the first power is not supplied to the control target apparatus and the transmission signal is acquired.

For example, when the external communication apparatus is connected to the power line via the power supply switch from the viewpoint of the control target apparatus, the above-described determination is performed in the determination process according to the embodiment, so that the control apparatus according to the embodiment can drive the control target apparatus with the second power in a target control process to be described below when a situation in which the first power is not supplied even if the power supply switch is on occurs (for example, at the time of a power failure).

The control apparatus according to the embodiment does not determine that the control target apparatus is driven with the second power, for example, when the first power is not supplied to the control target apparatus and the transmission signal is not acquired.

For example, when the external communication apparatus is connected to the power line via the power supply switch from the viewpoint of the control target apparatus, the above-described determination is performed in the determination process according to the embodiment, so that the control apparatus according to the embodiment can prevent the control target apparatus from being driven with the second power even when the power supply switch is off in the target control process to be described below.

(2) Target Control Process

The control apparatus according to the embodiment drives the control target apparatus with the second power, for example, when the control target apparatus is determined to be driven with the second power in the process (the determination process) of the foregoing (1). Further, the control apparatus according to the embodiment does not drive the control target apparatus with the second power, for example, when the control target apparatus is not determined to be driven with the second power in the process (the determination process) of the foregoing (1).

Here, the control apparatus according to the embodiment selectively drives the control target apparatus with the second power, for example, by transmitting a signal including a control command related to the driving with the second power to the control target apparatus.

The control apparatus according to the embodiment performs, for example, the process (the determination process) of the foregoing (1) and the process (the target control process) of the foregoing (2) as the process related to the control method according to the embodiment.

Here, the control apparatus according to the embodiment selectively drives the control target apparatus with the second power when the control target apparatus is determined to be driven with the second power based on the determination result of the process (the determination process) of the foregoing (1) in the process (the target control process) of the foregoing (2).

FIG. 2 is an explanatory diagram illustrating an example of an operation of a control target apparatus according to an embodiment of which driving is controlled with second power by a control apparatus according to the embodiment. Here, "POWER SUPPLY FROM EXTERNAL POWER SUPPLY" illustrated in FIG. 2 does not indicate supply of the first power to the control target apparatus according to the embodiment, but indicates a supply state of the power from an external power supply. That is, the state of "NO POWER SUPPLY FROM EXTERNAL POWER SUPPLY" shown in FIG. 2 corresponds to, for example, the time of a power failure. In FIG. 2, the driving with the second power supplied from the battery in the control target apparatus is indicated by "BATTERY DRIVING."

As described above, the control apparatus according to the embodiment does not determine that the control target apparatus is driven with the second power, for example, when the first power is supplied to the control target apparatus (for example, which corresponds to "a state in which the power is supplied from the external power supply" and "an ON state of the power supply switch" in FIG. 2). Accordingly, in the foregoing case, the control target apparatus operates with the first power, for example, as shown in part A of FIG. 2.

As described above, the control apparatus according to the embodiment determines that the control target apparatus is driven with the second power, for example, when the first power is not supplied to the control target apparatus and the transmission signal is acquired (for example, which corresponds to "a state in which the power is not supplied from an external power supply" and "the ON state of the power supply switch" in FIG. 2). Accordingly, in the foregoing case, the control target apparatus operates with the second power supplied from the battery, for example, as shown in part B of FIG. 2.

As described above, the control apparatus according to the embodiment does not determine that the control target apparatus is driven with the second power, for example, when the first power is not supplied to the control target apparatus and the transmission signal is not acquired (for example, which corresponds to "a state in which the power is supplied from an external power supply" and "an OFF state of the power supply switch" or corresponds to "a state in which the power is not supplied from an external power supply" and "the OFF state of the power supply switch" in FIG. 2). Accordingly, in the foregoing case, the control target apparatus does not operate with the first power and the second power supplied from the battery, for example, as shown in part C of FIG. 2.

For example, as illustrated in FIG. 2, the control apparatus according to the embodiment can drive the control target apparatus with the second power when, for example, a state in which the first power is not supplied (for example, the time of a power failure) even though the power supply switch is on occurs. The control apparatus according to the embodiment can prevent the control target apparatus from being driven with the second power, for example, even when the power supply switch is off.

Accordingly, the control apparatus according to the embodiment performs, for example, the process (the determination process) of the foregoing (1) and the process (the target control process) of the foregoing (2) as the process related to the control method according to the embodiment, so that the driving of the control target apparatus which can be driven with the first power supplied from an external power supply and the second power supplied from the battery can be controlled with the second power.

Further, the control apparatus according to the embodiment performs, for example, the process (the determination process) of the foregoing (1) and the process (the target control process) of the foregoing (2) as the process related to the control method according to the embodiment, so that it is possible to prevent occurrence of an undesirable state, for example, a state in which "the control target apparatus continues to be driven until the second power is not supplied from the battery even though the user performs a manipulation of turning off the power supply switch." When an example of the control target apparatus according to the embodiment is an illuminator (lighting apparatus), for example, the control apparatus according to the embodiment performs, for example, the process (the determination process) of the foregoing (1) and the process (the target control process) of the foregoing (2) as the process related to the control method according to the embodiment, so that it is possible to prevent occurrence of, for example, "a case in which lighting continues until the second power is not supplied from the battery, even though the user performs a manipulation of turning off the power supply switch," which can occur in the existing apparatus.

Accordingly, the control apparatus according to the embodiment performs, for example, the process (the determination process) of the foregoing (1) and the process (the target control process) of the foregoing (2) as the process related to the control method according to the embodiment, so that convenience for the user can be prevented from deteriorating.

The process related to the control method according to the embodiment is not limited to the process (the determination process) of the foregoing (1) and the process (the target control process) of the foregoing (2).

For example, the control apparatus according to the embodiment may cause a result of the process (the determination process) of the foregoing (1), a result of the process (the target control process) of the foregoing (2), or the like to be notified of (notification control process). For example, the control apparatus according to the embodiment causes a device (for example, a display device or an audio output device such as a speaker) related to the notification and included in the control apparatus according to the embodiment or an external apparatus to perform the notification of the result of the process (the determination process) of the foregoing (1), the result of the process (the target control process) of the foregoing (2), or the like.

For example, when the external apparatus is caused to perform the notification, for example, the control apparatus according to the embodiment transmits control data for controlling the notification to the external apparatus in a wired or wireless manner, so that the external apparatus is caused to perform the notification of the result of the process (the determination process) of the foregoing (1), the result of the process (the target control process) of the foregoing (2), or the like. Here, the control data controlling the notification according to the embodiment includes, for example, a notification command for performing the notification. The control data controlling the notification according to the embodiment may further include, for example, data (for example, image data or audio data) indicating notification content.

Hereinafter, an example of the process related to the control method in the control apparatus according to the embodiment will be described more specifically.

Figure 3:
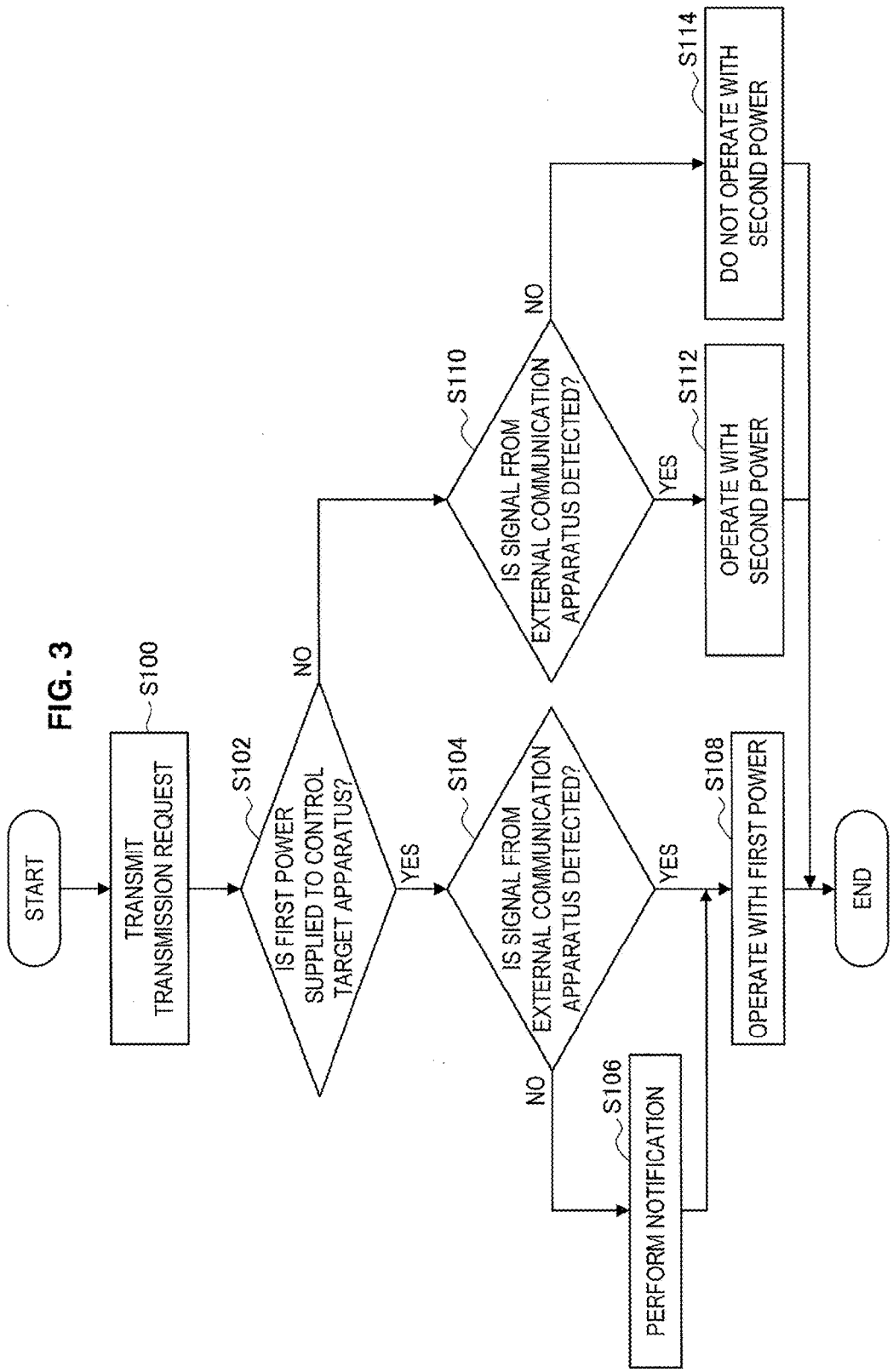
FIG. 3 is a flowchart illustrating an example of a process related to a control method according to the embodiment in the control apparatus according to the embodiment.

FIG. 3 is a flowchart illustrating an example of the process related to the control method according to the embodiment in the control apparatus according to the embodiment. Here, for example, processes of steps S102, S104, and S110 illustrated in FIG. 3 correspond to the process (the determination process) of the foregoing (1). For example, processes of steps S108, S112, and S114 illustrated in FIG. 3 correspond to the process (the target control process) of the foregoing (2). For example, a process of step S106 illustrated in FIG. 3 corresponds to the notification control process according to the embodiment.

The control apparatus according to the embodiment causes, for example, a communication unit (which will be described below) to transmit a transmission request (which is an example of a signal for transmitting the transmission signal) (S100).

For example, the control apparatus according to the embodiment determines whether the first power is supplied to the control target apparatus (S102). The control apparatus according to the embodiment determines that the first power is supplied to the power target apparatus, for example, when a signal indicating the supply state of the first power acquired from the control target apparatus indicates that the first power is supplied.

When it is determined in step S102 that the first power is supplied to the control target apparatus, for example, the control apparatus according to the embodiment determines whether a signal (the transmission signal) transmitted from the external communication apparatus in response to the transmission request transmitted in step S100 is detected (S104).

When it is determined in step S104 that the signal transmitted from the external communication apparatus is detected, the control apparatus according to the embodiment performs a process of step S108 to be described below.

When it is not determined in step S104 that the signal transmitted from the external communication apparatus is detected, the control apparatus according to the embodiment causes, for example, a device related to the notification and included in the control apparatus according to the embodiment to perform the notification (S106). Here, when it is not determined in step S104 that the signal transmitted from the external communication apparatus is detected despite the fact that it is determined in step S102 that the first power is supplied to the control target apparatus, there is a possibility that the external communication apparatus is not operating normally or that the external communication apparatus is broken. Accordingly, an example of the notification in step S106 can include error notification indicating that the external communication apparatus is not operating normally or the external communication apparatus is broken. It is needless to say that the notification in step S106 is not limited to the error notification.

When it is determined in step S104 that the signal transmitted from the external communication apparatus is detected or the process of step S106 is performed, the control apparatus according to the embodiment causes the control target apparatus to operate with the supplied first power (S108).

When it is not determined in step S102 that the first power is supplied to the control target apparatus, for example, the control apparatus according to the embodiment determines whether, for example, the signal (the transmission signal) transmitted from the external communication apparatus in response to the transmission request transmitted in step S100 is detected (S110).

When it is determined in step S110 that the signal transmitted from the external communication apparatus is detected, the control apparatus according to the embodiment causes the control target apparatus to operate with the second power supplied from the battery (S112).

When it is not determined in step S110 that the signal transmitted from the external communication apparatus is detected, the control apparatus according to the embodiment does not cause the control target apparatus to operate with the second power supplied from the battery (S114).

The control apparatus according to the embodiment performs, for example, the process illustrated in FIG. 3 as the process related to the control method according to the embodiment. The process (the determination process) of the foregoing (1) and the process (the target control process) of the foregoing (2) related to the control method according to the embodiment are realized, for example, by performing the process illustrated in FIG. 3.

Accordingly, the control apparatus according to the embodiment can control the driving of the control target apparatus, which can be driven with the first power supplied from an external power supply and the second power supplied from the battery, with the second power, for example, by performing the process illustrated in FIG. 3. Further, for example, the control apparatus according to the embodiment can prevent convenience from deteriorating for the user, for example, by performing the process illustrated in FIG. 3. It is needless to say that the process related to the control method according to the embodiment is not limited to the example illustrated in FIG. 3.

(Control System According to Embodiment)

Next, an example of the configuration of the control system according to the embodiment including the control apparatus according to the embodiment capable of performing the process related to the control method according to the embodiment described above will be described. Hereinafter, an example of the configuration of the control apparatus according to the embodiment will be described while describing the example of the configuration of the control system according to the embodiment.

[1] Example of Configuration of Control System According to First Embodiment

Figure 4:
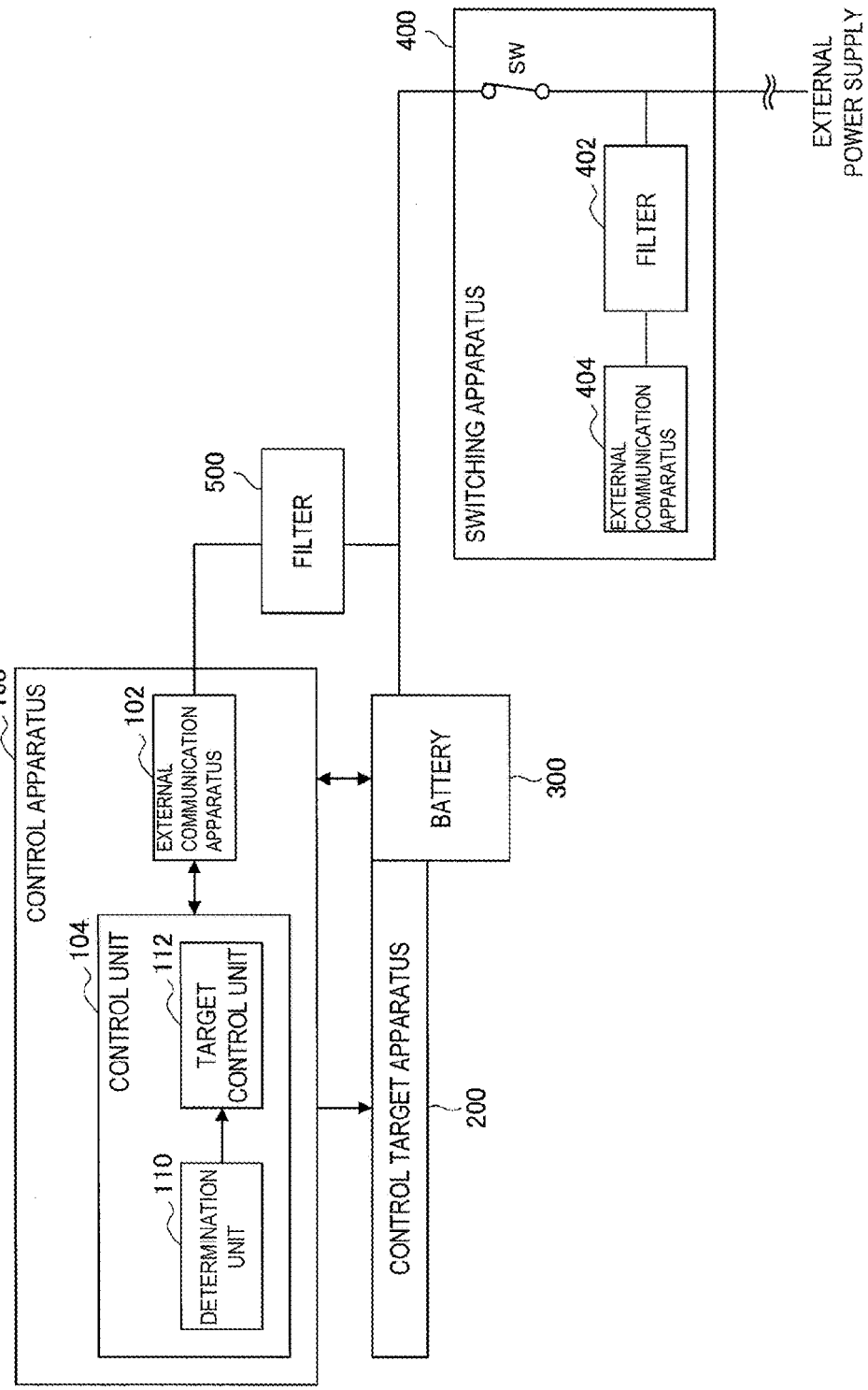
FIG. 4 is an explanatory diagram illustrating an example of the configuration of a control system according to a first embodiment.

FIG. 4 is an explanatory diagram illustrating an example of the configuration of a control system 1000 according to a first embodiment. The control system 1000 includes, for example, a control apparatus 100, a control target apparatus 200, a battery 300, a switching apparatus 400, and a filter 500.

Here, in FIG. 4, a communication unit 404 included in the switching apparatus 400 corresponds to the external communication apparatus according to the embodiment. The configuration in which the switching apparatus 400 includes the communication unit 404 corresponding to the external communication apparatus according to the embodiment is illustrated in FIG. 4, but the configuration of the control system according to the embodiment is not limited thereto. For example, the communication unit 404 and a filter 402 illustrated in FIG. 4 may be an external apparatus of the switching apparatus 400.

[1-1] Control Apparatus 100

The control apparatus 100 includes, for example, a communication unit 102 and a control unit 104. Here, for example, the control apparatus 100 performs driving with the first power obtained from the power line or the second power supplied from the battery 300.

The control apparatus 100 may include, for example, a read-only memory (ROM) (not illustrated), a random access memory (RAM) (not illustrated), a storage unit (not illustrated), a manipulation unit (not illustrated) which a user can manipulate, and a display unit (not illustrated) which displays various screens on a display screen. In the control apparatus 100, these constituent elements are connected by, for example, a bus serving as a data transmission line.

Here, the ROM (not illustrated) stores a program used by the control unit 104 or control data such as an arithmetic parameter. The RAM (not illustrated) temporarily stores a program or the like executed by the control unit 104.

The storage unit (not illustrated) is storage means included in the control apparatus 100 and stores, for example, various kinds of data such as applications. Here, examples of the storage unit (not illustrated) include a magnetic recording medium such as hard disk and a non-volatile memory such as a flash memory. The storage unit (not illustrated) may be detachably mounted on the control apparatus 100.

The manipulation unit (not illustrated) is manipulation means included in the control apparatus 100. Examples of the manipulation unit (not illustrated) include a button, a direction key, a rotary selector such as a jog dial, and a combination thereof.

The display unit (not illustrated) is display means included in the control apparatus 100. Examples of the display unit (not illustrated) include a liquid crystal display and an organic electro-luminescence (EL) display (or an organic light emitting diode (OLED) display). The display unit (not illustrated) may be, for example, a device through which display and user manipulation are possible, such as a touch screen.

The control apparatus 100 may be connected to an external device such as a manipulation input device (for example, a keyboard or a mouse) or a display device which is an external apparatus of the control apparatus 100.

The communication unit 102 communicates with an external communication apparatus (the communication unit 404 included in the switching apparatus 400 in the example illustrated in FIG. 4) via a power line.

[Communication Via Power Line According to Embodiment]

Here, communication via a power line according to the embodiment (hereinafter referred to as "power line communication") will be described more specifically.

The power line communication is performed between the communication unit 102 (or an external communication device having the same function or configuration as the communication unit 102 and the same applies below) and the external communication apparatus, for example, by applying a wireless communication technology such as a communication technology by near field communication (NFC) or a radio-frequency identification (RFID) technology to wired communication. Here, examples of the power line communication according to the embodiment include communication performed by contacting a terminal of each apparatus (so-called contact communication) and communication performed when a terminal of each apparatus is connected in a wired manner.

The communication unit 102 includes, for example, a high-frequency signal generation unit (which will be described below) that generates a high-frequency signal and transmits the high-frequency signal to the external communication apparatus. That is, the communication unit 102 has so-called reader and writer functions.

The external communication apparatus according to the embodiment communicates with the external apparatus, for example, by performing load modulation based on a signal transmitted from the external apparatus such as the control apparatus 100 including the communication unit 102. For example, when the external communication apparatus receives a high-frequency signal transmitted from the communication unit 102, the external communication apparatus obtains power from the received high-frequency signal to be driven and transmits a high-frequency signal by performing the load modulation based on the result obtained by processing the received high-frequency signal.

Here, examples of the high-frequency signal according to the embodiment include a signal with a frequency used for RFID and a signal with a frequency used for contactless communication. Examples of the frequency of the high-frequency signal include 130 [kHz] to 135 [kHz], 13.56 [MHz], 56 [MHz], 433 [MHz], 915.9 to 928.1 [MHz], 2441.75 [MHz], and 2448.875 [MHz], but the frequency of the high-frequency according to the embodiment is not limited thereto. High-frequency waves transmitted based on a high-frequency signal according to the embodiment are also referred to as "carrier waves" below in some cases.

For example, the communication unit 102 and the external communication apparatus perform the foregoing process so that the power line communication according to the embodiment is realized between the communication unit 102 and the external communication apparatus.

Here, a circuit size of the communication device using a wireless communication technology such as a communication technology by NFC can be miniaturized up to the size of an integrated circuit (IC) chip or the like due to the size relatively smaller than the size of an existing power-line communication (PLC) modem or the like. For example, since apparatuses capable of performing communication using wireless communication technologies such as communication technologies by NFC, such as mobile phones on which IC cards or IC chips are mounted, have become widespread, communication devices using wireless communication technologies such as communication technologies by NFC or RFID technologies have become cheaper than existing PLC modems.

By applying a wireless communication technology such as a communication technology by NFC or an RFID technology to wired communication, the external communication apparatus according to the embodiment can obtain power from a high-frequency signal received via a power line to be driven and transmit a signal by performing load modulation. That is, in a communication system including the communication unit 102 and the external communication apparatus according to the embodiment, the external communication apparatus according to the embodiment can perform communication in a wired manner even when the external communication apparatus does not include a separate power supply circuit performing communication. For example, the external communication apparatus according to the embodiment can transmit a signal by performing the load modulation even when a signal (a signal indicating a user instruction) according to a user's manipulation is not input.

Accordingly, by using the wireless communication technology such as the communication technology by NFC or the RFID technology, for example, it is possible to realize wired communication in which a reduction in cost, alleviation of restriction on the size of the communication device, a reduction in power consumption, and the like can be realized compared to a case in which wired communication such as the existing PLC is used.

The power line communication according to the embodiment is not limited to the communication in which the wireless communication technology such as the communication technology by NFC or the RFID technology is used. For example, power line communication such as PLC may be performed between the communication unit 102 and the external communication apparatus. When the power line communication such as PLC is performed between the communication unit 102 and the external communication apparatus, each of the communication unit 102 and the external communication apparatus includes, for example, a device related to the power line communication such as a PLC modem.

Hereinafter, an example of the configuration of each of the communication unit 102 and the external communication apparatus will be described exemplifying a case in which the power line communication in which the wireless communication technology such as the communication technology by NFC or the RFID technology is used is performed between the communication unit 102 and the external communication apparatus.

Figure 5:
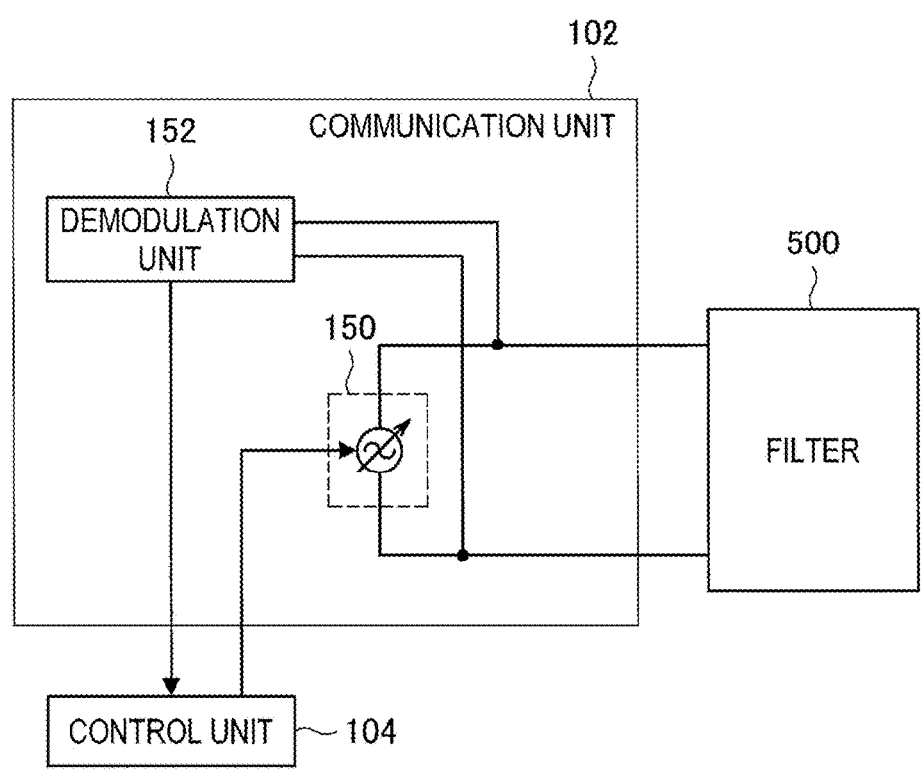
FIG. 5 is an explanatory diagram illustrating an example of the configuration of a communication unit included in the control apparatus according to the embodiment.

FIG. 5 is an explanatory diagram illustrating an example of the configuration of the communication unit 102 included in the control apparatus 100 according to the embodiment. Here, the control unit 104 and the filter 500 are illustrated together in FIG. 5.

The communication unit 102 includes, for example, a high-frequency signal generation unit 150 and a demodulation unit 152 and serves as a reader and writer (or an interrogator) in NFC or the like. The communication unit 102 may further include, for example, an encryption circuit (not illustrated) or a communication collision avoidance (anti-collision) circuit.

The high-frequency signal generation unit 150 receives, for example, a high-frequency signal generation command delivered from the control unit 104 and generates the high-frequency signal according to the high-frequency signal generation command. The high-frequency signal generation unit 150 receives, for example, a high-frequency signal transmission stop command delivered from the control unit 104 and indicating transmission stop of the high-frequency signal and stops generating the high-frequency signal. Here, in FIG. 5, an alternating-current power supply is illustrated as the high-frequency signal generation unit 150, but the high-frequency signal generation unit 150 according to the embodiment is not limited thereto. For example, the high-frequency signal generation unit 150 according to the embodiment can include a modulation circuit (not illustrated) that performs amplitude-shift keying (ASK) modulation and an amplification circuit (not illustrated) that amplifies an output of the modulation circuit.

Here, examples of the high-frequency signal generated by the high-frequency signal generation unit 150 include a high-frequency signal including a transmission request (which is an example of a signal causing the transmission signal to be transmitted) and a high-frequency signal including various processing commands for the external communication apparatus and data to be processed. The high-frequency signal generated by the high-frequency signal generation unit 150 may be, for example, an unmodulated signal.

The demodulation unit 152 demodulates the transmission signal transmitted from the external communication apparatus, for example, by performing envelope detection on an amplitude change of a voltage between the high-frequency signal generation unit 150 and the filter 500 and binarizing the detected signal. The demodulation unit 152 delivers the demodulated transmission signal to the control unit 104. Further, demodulation means for the transmission signal in the demodulation unit 152 is not limited thereto. For example, the demodulation unit 152 can also demodulate the transmission signal using a phase change of a voltage between the high-frequency signal generation unit 150 and the filter 500.

The communication unit 102 according to the embodiment can serve as a reader and writer in NFC or the like and serve to communicate with the external communication apparatus via the power line, for example, in the configuration illustrated in FIG. 5.

Figure 6:
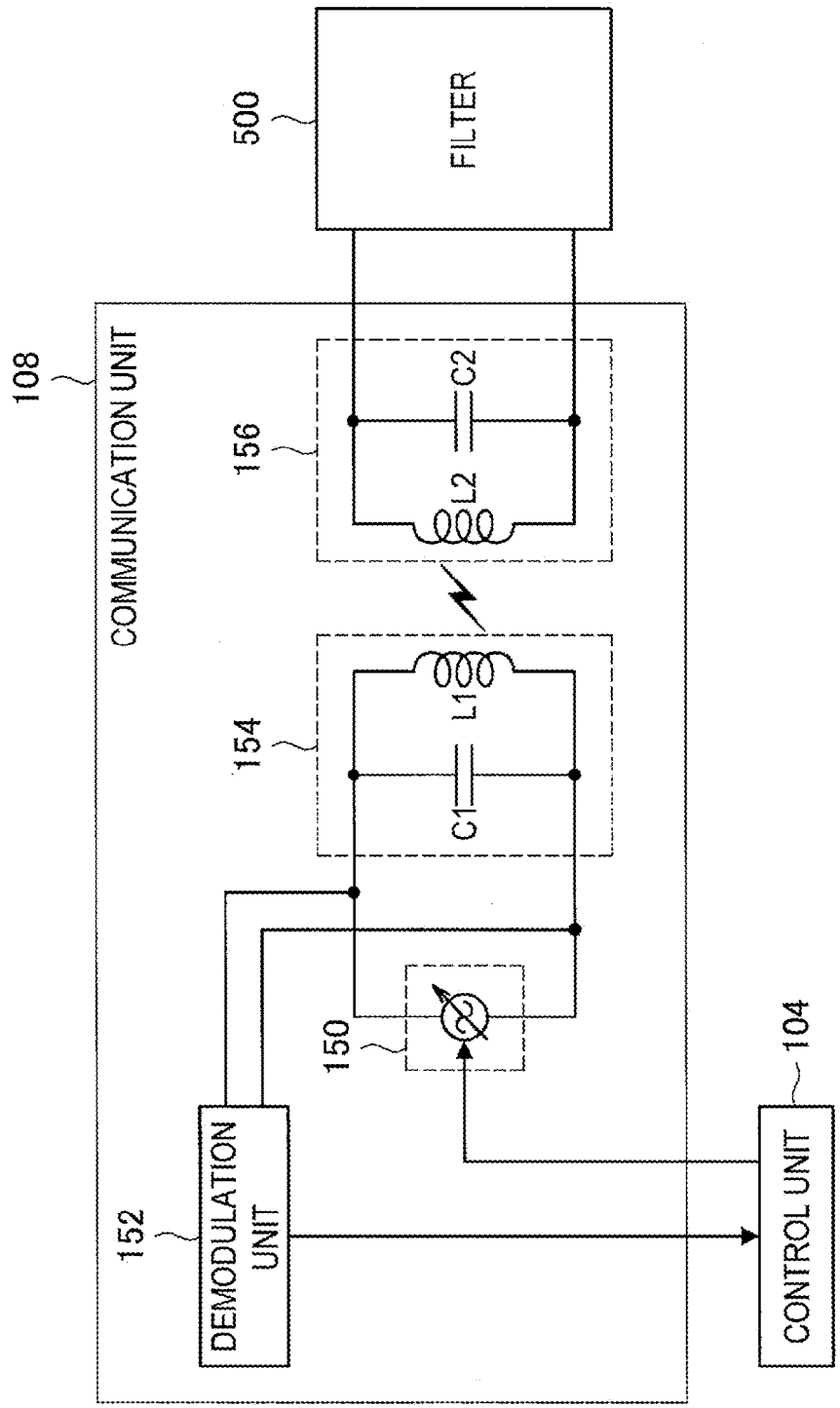
FIG. 6 is an explanatory diagram illustrating another example of the communication unit included in the control apparatus according to the embodiment.

The configuration of the communication unit 102 according to the embodiment is not limited to the configuration illustrated in FIG. 5. FIG. 6 is an explanatory diagram illustrating another example of the configuration of the communication unit 102 included in the control apparatus 100 according to the embodiment. Here, as in FIG. 5, the control unit 104 and the filter 500 are illustrated together in FIG. 6.

The communication unit 102 according to the other example includes the high-frequency signal generation unit 150, the demodulation unit 152, a first high-frequency transmission and reception unit 154, and a second high-frequency transmission and reception unit 156. The communication unit 102 according to the other example may further include, for example, an encryption circuit (not illustrated) or a communication collision avoidance (anti-collision) circuit.

As in the high-frequency signal generation unit 150 illustrated in FIG. 5, the high-frequency signal generation unit 150 generates a high-frequency signal according to a high-frequency signal generation command and stops generating the high-frequency signal according to a high-frequency signal transmission stop command.

The demodulation unit 152 demodulates the transmission signal transmitted from the external communication apparatus by performing envelope detection on an amplitude change of a voltage at an antenna end of the first high-frequency transmission and reception unit 154 and binarizing the detected signal. Further, modulation means for the transmission signal in the demodulation unit 152 is not limited thereto. For example, the demodulation unit 152 can also demodulate the transmission signal using a phase change of a voltage of an antenna end of the first high-frequency transmission and reception unit 154.

The first high-frequency transmission and reception unit 154 includes an inductor L1 having predetermined inductance and a capacitor C1 having predetermined electrostatic capacitance to form a resonant circuit. Here, an example of a resonant frequency of the first high-frequency transmission and reception unit 156 includes a frequency of a high-frequency signal such as 13.56 [MHz]. In the foregoing configuration, the first high-frequency transmission and reception unit 154 can transmit the high-frequency signal generated by the high-frequency signal generation unit 150 and receive the transmission signal transmitted from the second high-frequency transmission and reception unit 156 or transmitted from the external communication apparatus. That is, the first high-frequency transmission and reception unit 154 serves as a first communication antenna inside the communication unit 102.

The second high-frequency transmission and reception unit 156 includes an inductor L2 having predetermined inductance and a capacitor C2 having predetermined electrostatic capacitance to form a resonant circuit. Here, an example of a resonant frequency of the second high-frequency transmission and reception unit 156 includes a frequency of a high-frequency signal such as 13.56 [MHz]. In the foregoing configuration, the second high-frequency transmission and reception unit 156 can receive the high-frequency signal transmitted from the first high-frequency transmission and reception unit 154 and transmit the transmission signal transmitted from the external communication apparatus. That is, the second high-frequency transmission and reception unit 156 serves as a second communication antenna inside the communication unit 102.

As in the configuration illustrated in FIG. 5, in the configuration illustrated in FIG. 6, the communication unit 102 according to the embodiment can also serve as a reader and writer in NFC or the like and serve to communicate with the external communication apparatus via the power line, for example, in the configuration illustrated in FIG. 6.

The configuration of the communication unit 102 according to the embodiment is not limited to the configuration illustrated in FIG. 5 or 6. For example, when the power line communication such as PLC is performed between the communication unit 102 and the external communication apparatus, the communication unit 102 may be configured as, for example, a device related to the power line communication such as a PLC modem.

Referring again to FIG. 4, an example of the configuration of the control apparatus 100 will be described. The control unit 104 is configured to include a micro processing unit (MPU) or various processing circuits and serves to control the entire control apparatus 100. The control unit 104 includes, for example, a determination unit 110 and a target control unit 112 and serves mainly to perform a process related to the control method according to the embodiment.

The determination unit 110 serves mainly to perform the process (the determination process) of the foregoing (1) and determines whether the control target apparatus 200 is driven with the second power based on a supply state of the first power in the control target apparatus 200 and the transmission signal acquired from the external communication apparatus via the power line.

The target control unit 112 serves mainly to perform the process (the target control process) of the foregoing (2) and causes the control target apparatus 200 to be driven with the second power when the determination unit 110 determines that the control target apparatus 200 is driven with the second power. The target control unit 112 does not drive the control target apparatus 200 with the second power, for example, when the determination unit 110 does not determine that the control target apparatus 200 is driven with the second power.

The control unit 104 includes, for example, the determination unit 110 and the target control unit 112 and mainly performs the process related to the control method according to the embodiment.

For example, in the configuration illustrated in FIG. 4, the control apparatus 100 performs the process related to the control method according to the embodiment (for example, the process (the determination process) of the foregoing (1) and the process (the target control process) of the foregoing (2)).

Accordingly, for example, in the configuration illustrated in FIG. 4, the control apparatus 100 can control the driving of the control target apparatus, which can be driven with the first power supplied from an external power supply and the second power supplied from the battery, with the second power. For example, in the configuration illustrated in FIG. 4, the control apparatus 100 can prevent, for example, convenience from deteriorating for the user.

The configuration of the control apparatus according to the embodiment is not limited to the configuration illustrated in FIG. 4.

For example, the control apparatus according to the embodiment may further include a notification control unit (not illustrated) that performs a notification control process according to the embodiment.

For example, the control apparatus according to the embodiment may include the filter 500 to be described below.

For example, the control apparatus according to the embodiment can include one or both of the determination unit 110 and the target control unit 112 (for example, realized by separate processing circuits) illustrated in FIG. 4 separately from the control unit 104.

For example, when the control apparatus according to the embodiment communicates with the external communication apparatus according to the embodiment via an external communication device, the control apparatus according to the embodiment may not include the communication unit 102.

[1-2] Control Target Apparatus 200

The control target apparatus 200 is an apparatus that can be driven with the first power supplied from an external power supply via a power line and the second power supplied from the battery 300. The driving of the control target apparatus 200 with the second power supplied from the battery 300 is controlled by the control apparatus 100. An application example of the control target apparatus 200 will be described below.

[1-3] Battery 300

The battery 300 supplies the second power to, for example, an external apparatus such as the control target apparatus 200. Here, examples of the battery 300 include a secondary battery such as a lithium ion secondary battery or a lithium ion polymer secondary battery and a primary battery such as a dry battery or a lithium battery.

[1-4] Switching Apparatus 400

The switching apparatus 400 includes, for example, the power supply switch SW, the filter 402, and the communication unit 404.

The power supply switch SW selectively supplies the first power supplied from the external power supply, for example, according to a manipulation of a user turning the control target apparatus 200 or the like on or off via the power line.

The filter 402 is connected between the power line and the communication unit 404 and serves to filter a signal delivered from the power line. More specifically, the filter 402 has a function of cutting off at least a signal with a frequency of the power among signals delivered from the power line and not cutting off the high-frequency signal. Since the switching apparatus 400 includes the filter 402 so that the signal with the frequency of the power which may be noise is not delivered to the communication unit 404, it is possible to improve accuracy of the communication between the communication unit 404 and an external apparatus (more specifically, for example, the communication unit 102 included in the control apparatus 100 in the example illustrated in FIG. 4).

Figure 7:
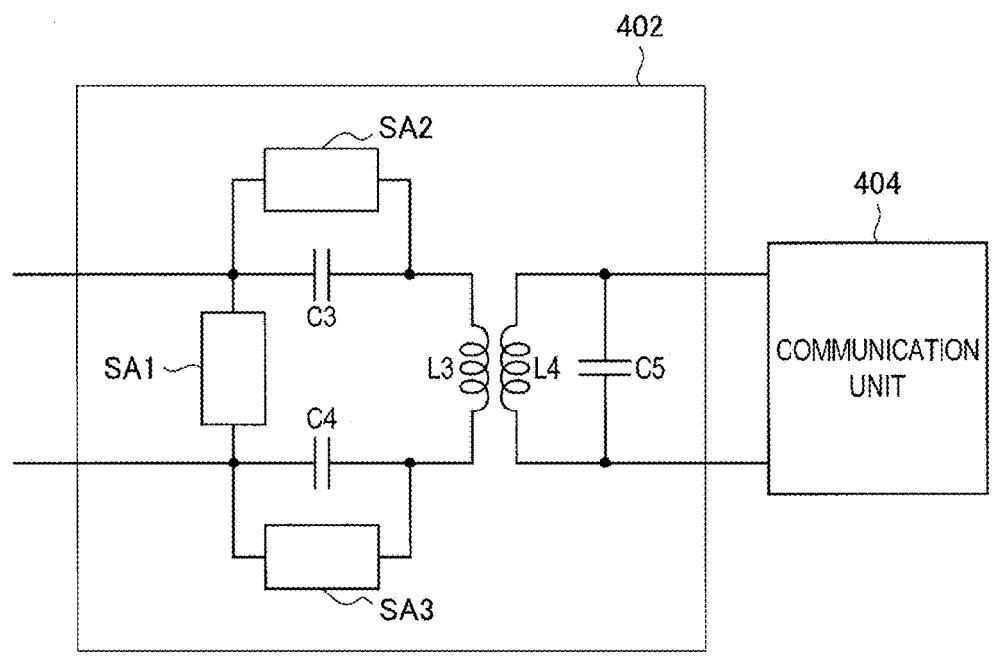
FIG. 7 is an explanatory diagram illustrating an example of the configuration of a filter included in a switching apparatus according to the embodiment.

FIG. 7 is an explanatory diagram illustrating an example of the configuration of the filter 402 included in the switching apparatus 400 according to the embodiment. Here, the communication unit 404 is also illustrated in FIG. 7.

The filter 402 is configured to include, for example, inductors L3 and L4, capacitors C3 to C5, and surge suppressors SA1 to SA3. It is needless to say that the configuration of the filter 402 according to the embodiment is not limited to the configuration illustrated in FIG. 7.

Referring back to FIG. 4, an example of the configuration of the switching apparatus 400 will be described. The communication unit 404 serves as an external communication apparatus according to the embodiment and communicates with the external apparatus such as the control apparatus 100 via the power line by the high-frequency signal. More specifically, for example, when the high-frequency signal transmitted from the external apparatus is received, the communication unit 404 obtains the power from the high-frequency signal to be driven and performs a process based on the received high-frequency signal. Then, the communication unit 404 transmits the transmission signal according to the process as the high-frequency signal through the load modulation.

For example, when the communication unit 404 receives the high-frequency signal including the transmission request (which is an example of the signal causing the transmission signal to be transmitted), the communication unit 404 superimposes the transmission signal based on the transmission request included in the high-frequency signal on the power line to transmit the transmission signal. For example, when the communication unit 404 receives the high-frequency signal including various processing commands and data to be processed, the communication unit 404 performs a process based on the processing commands or the data included in the high-frequency signal. Then, the communication unit 404 superimposes the transmission signal based on the process on the power line through the load modulation to transmit the transmission signal. That is, the communication unit 404 serves as, for example, a responder in NFC or the like.

Figure 8:
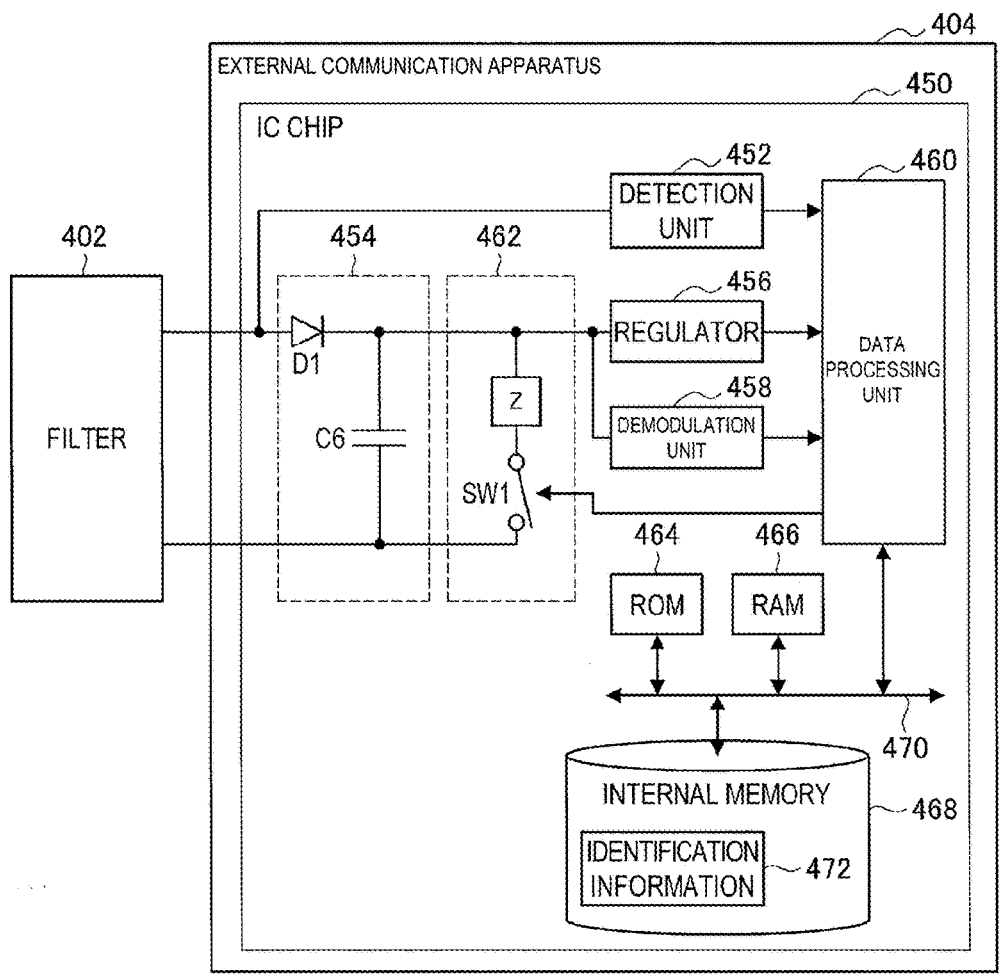
FIG. 8 is an explanatory diagram illustrating an example of the configuration of a communication unit included in the switching apparatus according to the embodiment.

FIG. 8 is an explanatory diagram illustrating an example of the configuration of the communication unit 404 included in the switching apparatus 400 according to the embodiment. Here, the filter 402 is also illustrated in FIG. 8. A configuration in which the communication unit 404 includes an IC chip 450 that demodulates the received high-frequency signal and transmits the transmission signal through the load modulation is illustrated in FIG. 8. The communication unit 404 according to the embodiment may not include each constituent element included in the IC chip 450 illustrated in FIG. 8 in the form of an IC chip.

The IC chip 450 includes, for example, a detection unit 452, a wave detection unit 454, a regulator 456, a demodulation unit 458, and a data processing unit 460, and a load modulation unit 462. Although not illustrated in FIG. 8, the IC chip 450 may further include, for example, a protection circuit (not illustrated) that prevents an overvoltage or an overcurrent from being applied to the data processing unit 460. Here, an example of the protection circuit (not illustrated) includes a clamp circuit formed by a diode and the like.

The IC chip 450 includes, for example, a ROM 464, a RAM 466, and an internal memory 468. The data processing unit 460, the ROM 464, the RAM 466, and the internal memory 468 are connected to each other by, for example, a bus 470 serving as a data transmission path.

The detection unit 452 generates, for example, a rectangular detection signal based on the high-frequency signal delivered from the filter 402 and delivers the detection signal to the data processing unit 460. The data processing unit 460 uses the delivered detection signal as, for example, a processing clock for data processing. Here, since the detection signal is based on the high-frequency signal delivered from the filter 402, the detection signal is synchronized with the frequency of the high-frequency signal transmitted from the external apparatus. Accordingly, the IC chip 450 includes the detection unit 452, so that a process with the external apparatus can be performed in synchronization with the external apparatus.

The wave detection unit 454 rectifies the high-frequency signal delivered from the filter 402. Here, the wave detection unit 454 is configured to include, for example, a diode D1 and a capacitor C6.

For example, the regulator 456 smooths the high-frequency signal, stabilizes the voltage of the high-frequency signal, and outputs a driving voltage to the data processing unit 460. Here, the regulator 456 uses, for example, a direct-current component of the high-frequency signal as the driving voltage.

The demodulation unit 458 demodulates the high-frequency signal and outputs data corresponding to the high-frequency signal (for example, a data signal binarized with high and low levels). Here, the demodulation unit 458 outputs, for example, an alternating-current component of the high-frequency signal as data.

For example, the data processing unit 460 is driven using the driving voltage output from the regulator 456 as a power supply and processes the data demodulated by the demodulation unit 458. Here, the data processing unit 460 is configured to include, for example, an MPU or various processing circuits.

The data processing unit 460 selectively generates a control signal controlling the load modulation related to a response to the external apparatus according to a processing result. Then, the data processing unit 460 selectively outputs the control signal to the load modulation unit 462.

For example, the data processing unit 460 reads data stored in the internal memory 468 for updating or the like based on a command included in the data demodulated by the demodulation unit 458.

The load modulation unit 462 includes, for example, a load Z and a switch SW1 and performs the load modulation by selectively connecting (validating) the load Z according to the control signal delivered from the data processing unit 460. Here, the load Z is configured as, for example, a resistor with a predetermined resistance value, but the load z is not limited thereto. The switch SW1 is configured as, for example, a p-channel type metal oxide semiconductor field effect transistor (MOSFET) or an n-channel type MOSFET, but the switch SW1 is not limited thereto.

The ROM 464 stores a program used by the data processing unit 460 or control data such as an arithmetic parameter. The RAM 466 temporarily stores a program executed by the data processing unit 460, an arithmetic result, an execution state, and the like.

The internal memory 468 is storage means included in the IC chip 450 and has, for example, a tamper resistant property. For example, the data processing unit 460 reads data, newly records data, and updates data. For example, identification information or various kinds of data such as applications are stored in the internal memory 468. Here, an example in which the internal memory 468 stores identification information 472 is illustrated in FIG. 8, but the data stored in the internal memory 468 is not limited thereto.

For example, in the foregoing configuration illustrated in FIG. 8, the IC chip 450 processes the high-frequency signal delivered from the filter 402 and superimposes the transmission signal on the power line to transmit the transmission signal through the load modulation via the filter 402. It is needless to say that the configuration of the IC chip 450 according to the embodiment is not limited to the configuration illustrated in FIG. 8.

For example, in the configuration illustrated in FIG. 8, the communication unit 404 can obtain power from the received high-frequency signal to be driven, perform a process indicated by the received high-frequency signal, and transmit the transmission signal according to the process through the load modulation.

Figure 9:
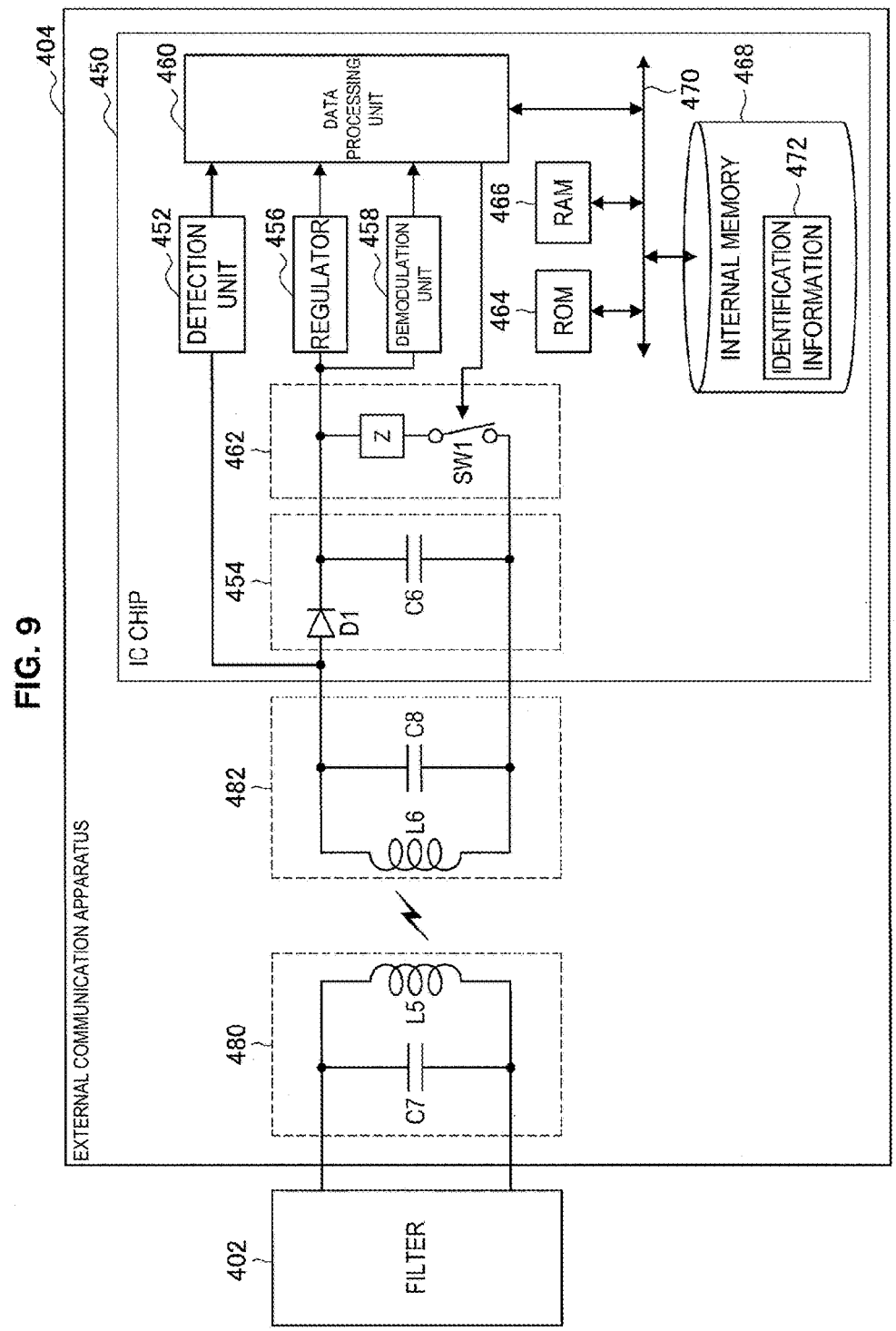
FIG. 9 is an explanatory diagram illustrating another example of the configuration of the communication unit included in the switching apparatus according to the embodiment.

The configuration of the communication unit 404 according to the embodiment is not limited to the configuration illustrated in FIG. 8. FIG. 9 is an explanatory diagram illustrating another example of the configuration of the communication unit 404 included in the switching apparatus 400 according to the embodiment. Here, the filter 402 is also illustrated in FIG. 9. The communication unit 404 according to the embodiment may not include each constituent element included in the IC chip 450 illustrated in FIG. 9 in the form of an IC chip.

The communication unit 404 according to the other example includes a first high-frequency transmission and reception unit 480, a second high-frequency transmission and reception unit 482, and an IC chip 450.

The first high-frequency transmission and reception unit 480 includes an inductor L5 having predetermined inductance and a capacitor C7 having predetermined electrostatic capacitance to form a resonant circuit. Here, an example of a resonant frequency of the first high-frequency transmission and reception unit 480 includes a frequency of a high-frequency signal such as 13.56 [MHz]. In the foregoing configuration, the first high-frequency transmission and reception unit 480 can transmit the high-frequency signal delivered from the filter 402 and receive the transmission signal transmitted from the second high-frequency transmission and reception unit 482. That is, the first high-frequency transmission and reception unit 480 serves as a first communication antenna inside the communication unit 404.

The second high-frequency transmission and reception unit 482 includes an inductor L6 having predetermined inductance and a capacitor C8 having predetermined electrostatic capacitance to form a resonant circuit. Here, an example of a resonant frequency of the second high-frequency transmission and reception unit 482 includes a frequency of a high-frequency signal such as 13.56 [MHz]. In the foregoing configuration, the second high-frequency transmission and reception unit 482 can receive the high-frequency signal transmitted from the first high-frequency transmission and reception unit 480 and transmit the transmission signal. More specifically, the second high-frequency transmission and reception unit 482 causes an induced voltage to be generated through electromagnetic induction in response to the reception of the high-frequency signal and outputs a reception voltage obtained by resonating the induced voltage at a predetermined resonance frequency to the IC chip 450. The second high-frequency transmission and reception unit 482 transmits the transmission signal through the load modulation performed in the load modulation unit 462 included in the IC chip 450. That is, the second high-frequency transmission and reception unit 482 serves as a second communication antenna inside the communication unit 404.

The IC chip 450 performs the same process as the IC chip 450 illustrated in FIG. 8 based on the reception voltage delivered from the second high-frequency transmission and reception unit 482.

Even in the configuration illustrated in FIG. 9, as in the configuration illustrated in FIG. 8, the communication unit 404 can obtain power from the received high-frequency signal to be driven, perform a process indicated by the received high-frequency signal, and transmit the transmission signal according to the process through the load modulation. When the communication unit 404 has the configuration illustrated in FIG. 9, for example, the IC chip related to NFC or RFID can be reused, and thus there is the advantage that mounting is easier.

The configuration of the communication unit 404 according to the embodiment is not limited to the configuration illustrated in FIG. 8 or 9. For example, when the power line communication such as PLC is performed between the external apparatus such as the control apparatus 100 and the communication unit 404, the communication unit 404 may be configured as, for example, a device related to the power line communication such as a PLC modem.

For example, in the configuration illustrated in FIG. 4, the switching apparatus 400 can selectively supply the first power supplied from the external power supply to the control target apparatus 200 or the like via the power line and can serve as the external communication apparatus according to the embodiment. As described above, the filter 402 and the communication unit 404 according to the embodiment may be, for example, external apparatuses of the switching apparatus according to the embodiment.

[1-5] Filter 500

The filter 500 is connected between the power line and the control apparatus 100 (more specifically, the communication unit 102) and serves to filter a signal delivered from the power line. More specifically, the filter 500 has a function of cutting off at least a signal with a frequency of the power among signals delivered from the power line and not cutting off the high-frequency signal.

In the control system 1000, the communication unit 102 communicates with the external communication apparatus via the filter 500, so that a signal with the frequency of the power which may be noise is not delivered to the communication unit 102. Accordingly, in the control system 1000, accuracy of the communication between the communication unit 102 and the external communication apparatus (more specifically, for example, the communication unit 404 included in the switching apparatus 400 in the example illustrated in FIG. 4) is improved.

Here, for example, the filter 500 has the same configuration as the filter 402 included in the switching apparatus 400 illustrated in FIG. 7. It is needless to say that the configuration of the filter 500 according to the embodiment is not limited to the same configuration as the filter 402 illustrated in FIG. 7.

The control system 1000 according to the first embodiment has, for example, the configuration illustrated in FIG. 4. In the control system 1000, the control apparatus 100 performs the process (the determination process) of the foregoing (1) and the process (the target control process) of the foregoing (2) related to the control method according to the embodiment based on the supply state of the first power in the control target apparatus 200 and the acquisition state of the transmission signal from the communication unit 404 included in the switching apparatus 400 serving as the external communication apparatus.

Accordingly, the control system capable of controlling the driving of the control target apparatus 200 with the second power is realized, for example, in the configuration illustrated in FIG. 4.

The configuration of the control system according to the first embodiment is not limited to the configuration illustrated in FIG. 4.

For example, the control apparatus according to the embodiment and the control target apparatus according to the embodiment may be an integrated apparatus. When the control apparatus according to the embodiment and the control target apparatus according to the embodiment are an integrated apparatus, the control apparatus according to the embodiment controls driving of a function to be controlled in the self-apparatus (the control apparatus according to the embodiment) with the second power.

For example, the control target apparatus according to the embodiment and the battery supplying the second power may be an integrated apparatus.

[2] Example of Configuration of Control System According to Second Embodiment

The configuration of the control system according to the embodiment is not limited to the configuration according to the first embodiment, as illustrated in FIG. 4. For example, the control system according to the embodiment may be configured to include the plurality of control apparatuses according to the embodiment and the plurality of control target apparatuses according to the embodiment.

Figure 10:
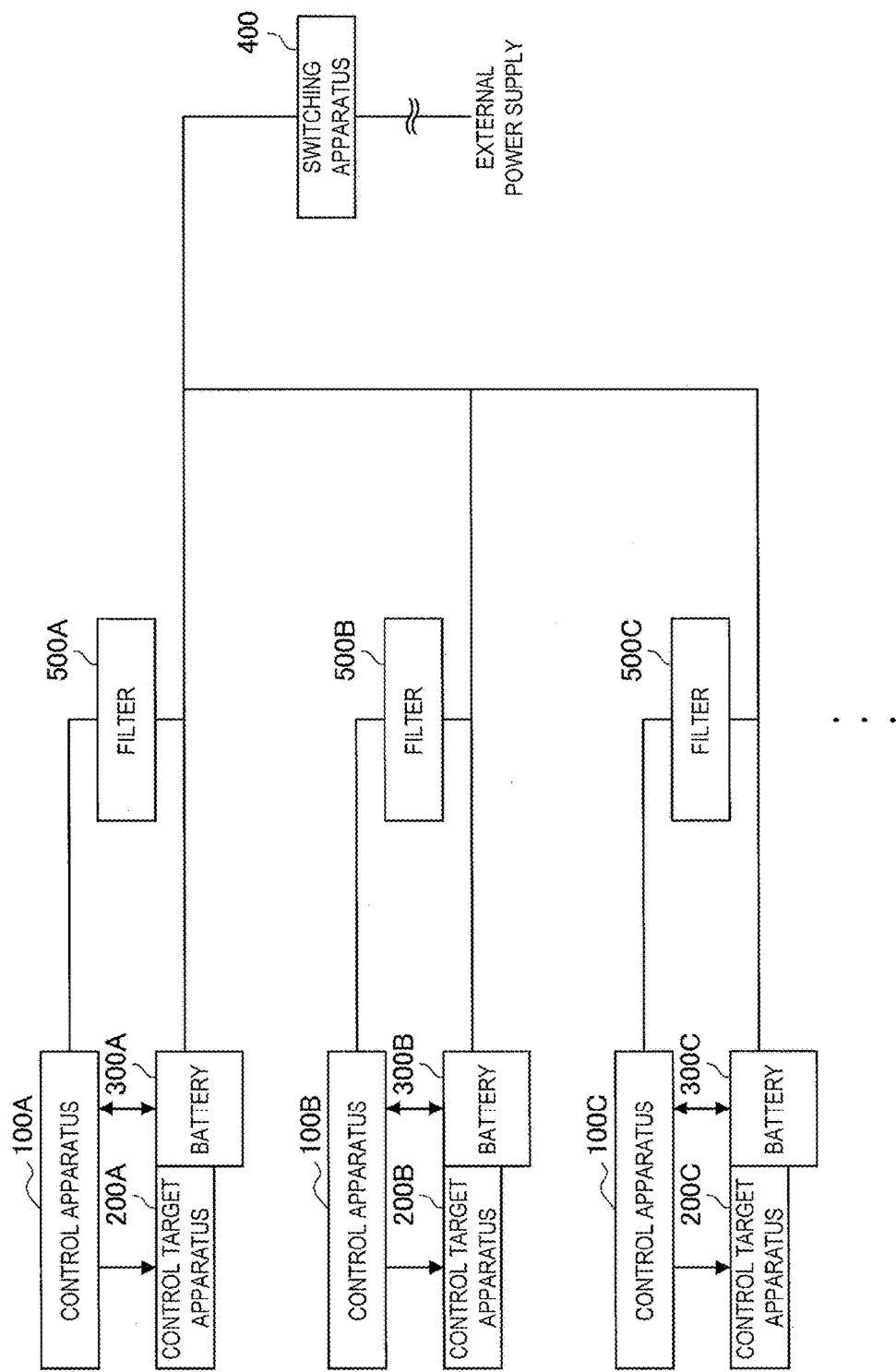
FIG. 10 is an explanatory diagram illustrating an example of the configuration of a control system according to a second embodiment.

FIG. 10 is an explanatory diagram illustrating an example of the configuration of a control system 2000 according to a second embodiment. The control system 2000 includes, for example, control apparatuses 100A, 100B, 100C, etc., control target apparatuses 200A, 200B, 200C, etc., batteries 300A, 300B, 300C, etc., a switching apparatus 400, and filters 500A, 500B, 500C, etc.

Here, in FIG. 10, as in the control system 1000 illustrated in FIG. 4 according to the first embodiment, a communication unit 404 included in the switching apparatus 400 corresponds to the external communication apparatus according to the embodiment. As described above, for example, the communication unit 404 and a filter 402 illustrated in FIG. 10 may be external apparatuses of the switching apparatus 400.

For example, each of the control apparatuses 100A, 100B, 100C, etc. has the same function and configuration as the control apparatus 100 illustrated in FIG. 4 according to the first embodiment.

For example, each of the control target apparatuses 200A, 200B, 200C, etc. has the same function and configuration as the control target apparatus 200 illustrated in FIG. 4 according to the first embodiment.

For example, the switching apparatus 400 has the same function and configuration as the switching apparatus 400 illustrated in FIG. 4 according to the first embodiment.

For example, each of the filters 500A, 500B, 500C, etc. has the same function and configuration as the filter 500 illustrated in FIG. 4 according to the first embodiment.

The control system 2000 according to the second embodiment has, for example, the configuration illustrated in FIG. 10. Here, in the control system 2000, for example, each of the control apparatuses 100A, 100B, 100C, etc. has the same function and configuration as the control apparatus 100 illustrated in FIG. 4 according to the first embodiment. Accordingly, in the control system 2000, each of the control apparatuses 100A, 100B, 100C, etc. performs the process (the determination process) of the foregoing (1) and the process (the target control process) of the foregoing (2) related to the control method according to the embodiment based on the supply state of the first power in the control target apparatus which is each control target and the acquisition state of the transmission signal from the communication unit 404 included in the switching apparatus 400 serving as the external communication apparatus.

Accordingly, for example, as illustrated in FIG. 10, even when the plurality of control apparatuses according to the embodiment and the plurality of control target apparatuses according to the embodiment are provided, the control system capable of controlling the driving of each of the control target apparatuses 200A, 200B, 200C, etc. with the second power is realized.

The configuration of the control system according to the second embodiment is not limited to the configuration illustrated in FIG. 10.

For example, the configuration in which pairs of the control apparatuses according to the embodiment and the control target apparatuses according to the embodiment which is a control target are connected in parallel is illustrated in FIG. 10. However, the control system may also have a configuration in which the pairs of the control apparatuses according to the embodiment and the control target apparatuses according to the embodiment which is a control target are connected in series.

For example, even when the pairs of the control apparatuses according to the embodiment and the control target apparatuses according to the embodiment which is a control target are connected in series, for example, the communication unit 102 included in each of the control apparatuses 100A, 100B, 100C, etc. can include, for example, a communication collision avoidance (anti-collision) circuit to use any communication collision avoidance technology, and thus it is possible to obtain the same advantageous effect as the control system 2000 illustrated in FIG. 10.

For example, the control system according to the second embodiment can also be realized according to the same modification examples as the control system according to the first embodiment described above.

[3] Example of Configuration of Control System According to Third Embodiment

The configuration of the control system according to the embodiment is not limited to the configuration according to the first embodiment, as illustrated in FIG. 4, or the configuration according to the second embodiment, as illustrated in FIG. 10. For example, the control system according to the embodiment can also manage a communication state of each control apparatus according to the embodiment in addition to the configuration according to the second embodiment.

Figure 11:
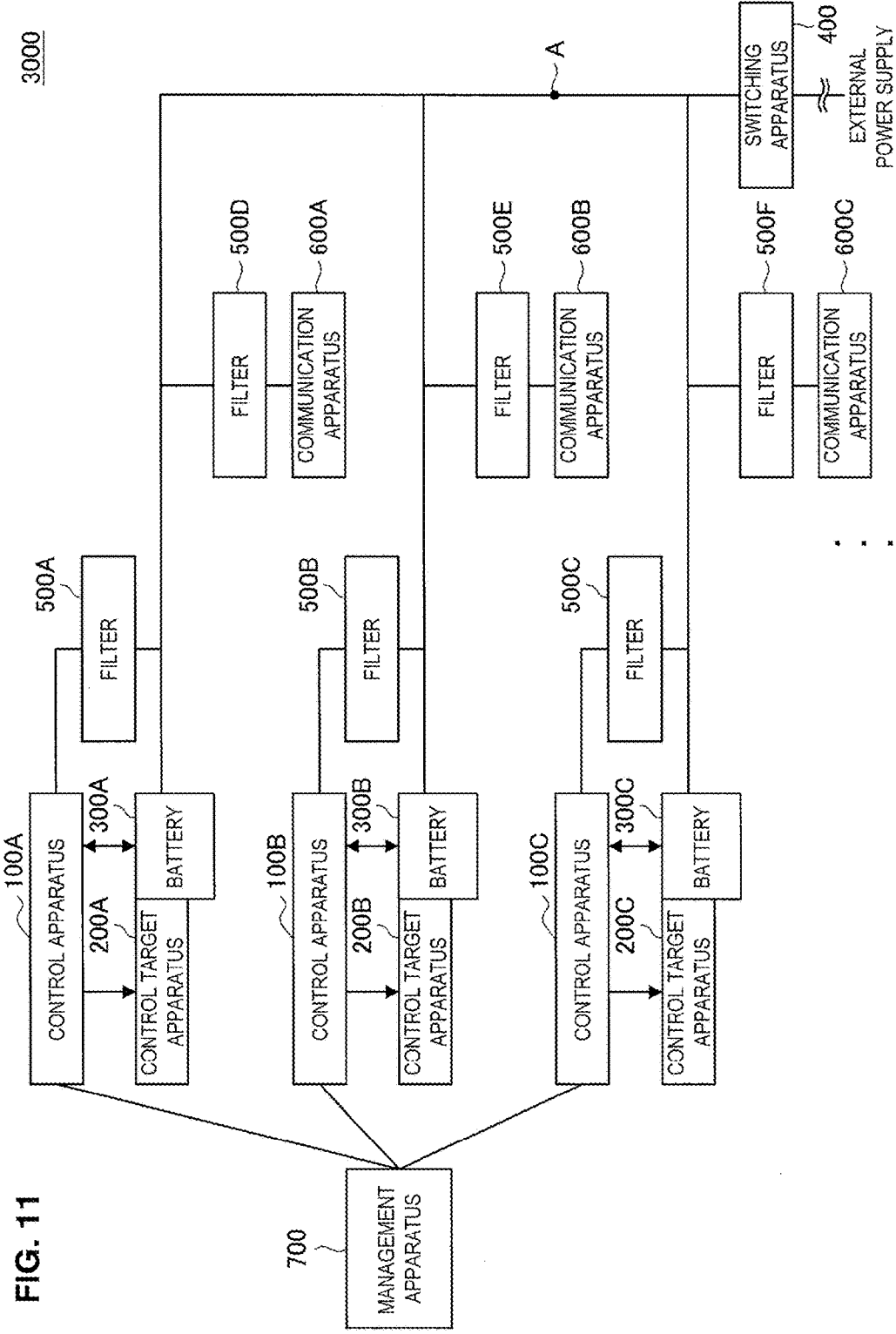
FIG. 11 is an explanatory diagram illustrating an example of the configuration of a control system according to a third embodiment.

FIG. 11 is an explanatory diagram illustrating an example of the configuration of a control system 3000 according to a third embodiment. The control system 3000 includes, for example, control apparatuses 100A, 100B, 100C, etc., control target apparatuses 200A, 200B, 200C, etc., batteries 300A, 300B, 300C, etc., a switching apparatus 400, filters 500A, 500B, 500C, 500D, 500E, 500F etc., communication apparatuses 600A, 600B, 600C, etc., and a management apparatus 700.

Here, in FIG. 11, as in the control system 1000 illustrated in FIG. 4 according to the first embodiment, a communication unit 404 included in the switching apparatus 400 corresponds to the external communication apparatus according to the embodiment. As described above, for example, the communication unit 404 and a filter 402 illustrated in FIG. 11 may be external apparatuses of the switching apparatus 400.

In FIG. 11, each of the communication apparatuses 600A, 600B, 600C, etc. also corresponds to the external communication apparatus according to the embodiment.

For example, each of the control apparatuses 100A, 100B, 100C, etc. has the same function and configuration as the control apparatus 100 illustrated in FIG. 4 according to the first embodiment.

For example, each of the control apparatuses 100A, 100B, 100C, etc. further includes a communication device that communicates with the management apparatus 700 in a wired or wireless manner. Here, examples of the communication device include a communication antenna and a radio frequency (RF) circuit (for wireless communication), an IEEE 802.15.1 port and a transmission and reception circuit (for wireless communication), an IEEE 802.11.b port and a transmission and reception circuit (for wireless communication), and a local area network (LAN) terminal and a transmission and reception circuit (for wired communication).

For example, each of the control target apparatuses 200A, 200B, 200C, etc. has the same function and configuration as the control target apparatus 200 illustrated in FIG. 4 according to the first embodiment.

For example, the switching apparatus 400 has the same function and configuration as the switching apparatus 400 illustrated in FIG. 4 according to the first embodiment.

For example, each of the filters 500A, 500B, 500C, 500D, 500E, 500F, etc. has the same function and configuration as the filter 500 illustrated in FIG. 4 according to the first embodiment.

Each of the communication apparatuses 600A, 600B, 600C, etc. serves as the external communication apparatus according to the embodiment and, for example, transmits a transmission signal based on a transmission request (which is an example of a signal causing the transmission signal to be transmitted) transmitted from each of the control apparatuses 100A, 100B, 100C, etc.

Here, each of the communication apparatuses 600A, 600B, 600C, etc. has the same configuration as the communication unit 404 included in the switching apparatus 400 according to the first embodiment.

For example, the management apparatus 700 manages a communication state in the control system 3000 based on information indicating a communication state acquired from each of the control apparatuses 100A, 100B, 100C, etc.

Here, an example of the information indicating the communication state according to the embodiment includes data including identification information of the control apparatus and identification information of the external communication apparatus transmitting the transmission signal. Further, the information indicating the communication state according to the embodiment may include, for example, data indicating a date on which the transmission request (which is an example of the signal causing the transmission signal to be transmitted) is transmitted or data indicating a date on which the transmission signal is acquired.

For example, when the management apparatus 700 transmits a transmission request of the information indicating the communication state to the control apparatus according to the embodiment, the management apparatus 700 acquires the information indicating the communication state from the control apparatus. Here, for example, the control apparatus according to the embodiment may transmit the transmission request (which is an example of the signal causing the transmission signal to be transmitted) in response to the reception of the transmission request of the information indicating the communication state.

The method of acquiring the information indicating the communication state according to the embodiment is not limited thereto. For example, the management apparatus 700 may acquire the information indicating the communication state by receiving information indicating a communication state transmitted periodically or aperiodically from the control apparatus.

For example, the management apparatus 700 can record and manage a communication state of each control apparatus in a log by using the information indicating the communication state acquired from each of the control apparatuses 100A, 100B, 100C, etc.

For example, the management apparatus 700 can also detect disconnection of the power line by using the information indicating the communication state acquired from each of the control apparatuses 100A, 100B, 100C, etc. and data (data indicating a signal path related to communication) indicating a wiring state of the power line.

Specifically, for example, when the power line is disconnected at a point A illustrated in FIG. 11, the control apparatuses 100A and 100B may not communicate with the communication unit 404 (which is an example of the external communication apparatus) included in the switching apparatus 400, and therefore may not acquire the transmission signal transmitted from the communication unit 404. On the other hand, for example, even when the power line is disconnected at the point A illustrated in FIG. 11, the control apparatus 100C can communicate with the communication unit 404 (which is an example of the external communication apparatus) included in the switching apparatus 400, and therefore can acquire the transmission signal transmitted from the communication unit 404.

Accordingly, the management apparatus 700 can detect the disconnection of the power line and specify a disconnected portion (a range including a disconnected portion of the power line) by using the information indicating the communication state acquired from each of the control apparatuses 100A, 100B, 100C, etc. and data indicating the arrangement of the power line illustrated in FIG. 11.

The control system 3000 according to the third embodiment has, for example, the configuration illustrated in FIG. 11. Here, in the control system 3000, for example, each of the control apparatuses 100A, 100B, 100C, etc. has the same function and configuration as the control apparatus 100 illustrated in FIG. 4 according to the first embodiment. Accordingly, in the control system 3000, each of the control apparatuses 100A, 100B, 100C, etc. performs the process (the determination process) of the foregoing (1) and the process (the target control process) of the foregoing (2) related to the control method according to the embodiment based on the supply state of the first power in the control target apparatus which is each control target and the acquisition state of the transmission signal from the communication unit 404 included in the switching apparatus 400 serving as the external communication apparatus.

Accordingly, for example, in the configuration illustrated in FIG. 11, as in the control system 2000 illustrated in FIG. 10 according to the second embodiment, for example, the control system capable of controlling the driving of each of the control target apparatuses 200A, 200B, 200C, etc. with the second power is realized.

For example, in the configuration illustrated in FIG. 11, the control system capable of managing the communication state in each control apparatus according to the embodiment is realized.

The configuration of the control system according to the third embodiment is not limited to the configuration illustrated in FIG. 11.

For example, the configuration in which the control system 3000 includes the management apparatus 700 is illustrated in FIG. 11, but the control apparatus according to any one of the embodiments included in the control system may serve as the management apparatus 700.

For example, the control system according to the third embodiment can also be realized according to the same modification examples as the control system according to the second embodiment described above.

The control apparatus has been exemplified above according to the embodiment, but the embodiment is not limited thereto. For example, the embodiment can be applied to various apparatuses such as apparatuses or computers installed on ceilings, walls, or the like of buildings. For example, the embodiment can also be applied to a processing IC which can be embedded in the foregoing apparatus. As described above, the control apparatus according to the embodiment and the control target apparatus according to the embodiment may be an integrated apparatus.

The control target apparatus has been exemplified above according to the embodiment, but the embodiment is not limited thereto. For example, the embodiment can be applied to various apparatuses which can be driven with the first power supplied from an external power supply and the second power supplied from a battery. For example, the embodiment can be applied to various apparatuses for which power supply switches for turning operations on and off one by one are not provided (or various apparatuses for which it is not practical to provide power supply switches for turning operations on and off one by one), such as illuminators or electric pans installed on ceilings, walls, or the like of buildings.

The switching apparatus has been exemplified according to the embodiment, but the embodiment is not limited thereto. For example, the embodiment can be applied to various apparatuses such as power supply switches, power supply taps or the like installed on walls of buildings.

The communication apparatus has been exemplified according to the embodiment, but the embodiment is not limited thereto. For example, the embodiment can be applied to IC chips or communication devices embedded in various apparatuses or facilities The management apparatus has been exemplified according to the embodiment, but the embodiment is not limited thereto. For example, the embodiment can be applied to various apparatuses such as tablet apparatuses, communication apparatuses such as mobile phones or smartphones, and computers such as personal computers (PCs) and servers.

(Program According to Embodiment)

By executing a program (for example, a program executing the process related to the control method according to the embodiment, such as the process (the determination process) of the foregoing (1) and the process (the target control process) of the foregoing (2)) causing a computer to function as the control apparatus according to the embodiment, it is possible to control driving of the control target apparatus, which can be driven with the first power supplied from an external power supply and the second power supplied from a battery, with the second power. For example, by executing the program causing a computer to function as the control apparatus according to the embodiment in the computer, it is possible to prevent convenience from deteriorating for a user.

The preferred embodiments of the present disclosure have been described above with reference to the accompanying drawings, whilst the present invention is not limited to the above examples, of course. A person skilled in the art may find various alternations and modifications within the scope of the appended claims, and it should be understood that they will naturally come under the technical scope of the present disclosure.

For example, the above shows that a program (computer program) causing a computer to function as a control apparatus according to the present embodiment is provided, but the present embodiment can further provide a recording medium caused to store the program.

The above configuration shows an example of the present embodiment and naturally comes under the technical scope of the present disclosure.

Additionally, the present technology may also be configured as below.

(1)
A control apparatus including:
a determination unit configured to determine whether a control target apparatus drivable with first power supplied from an external power supply and second power supplied from a battery is driven with the second power, on the basis of a supply state of the first power and a transmission signal acquired via a power line from an external communication apparatus connected to the power line through which the first power is transmitted; and
a target control unit configured to drive the control target apparatus with the second power when the control target apparatus is determined to be driven with the second power.

(2)
The control apparatus according to (1),
wherein, when the first power is supplied to the control target apparatus, the determination unit does not determine that the control target apparatus is driven with the second power, and
wherein, when the first power is not supplied to the control target apparatus, the determination unit determines whether the control target apparatus is driven with the second power, on the basis of an acquisition state of the transmission signal.

(3)
The control apparatus according to (2),
wherein, when the first power is not supplied to the control target apparatus and the transmission signal is acquired, the determination unit determines that the control target apparatus is driven with the second power, and
wherein, when the first power is not supplied to the control target apparatus and the transmission signal is not acquired, the determination unit does not determine that the control target apparatus is driven with the second power.

(4)
The control apparatus according to any one of (1) to (3), further including:
a communication unit configured to communicate with the external communication apparatus via the power line,
wherein the determination unit acquires the transmission signal from the external communication apparatus by causing the communication unit to communicate with the external communication apparatus.

(5)
The control apparatus according to (4),
wherein the communication unit
transmits, to the external communication apparatus, a signal causing the transmission signal to be transmitted, and
receives the transmission signal transmitted in such a manner that load modulation is performed based on the received signal in the external communication apparatus.

(6)
The control apparatus according to (4) or (5),
wherein the communication unit
is connected to a filter that is connected to the power line, cuts off at least a signal with a frequency of the first power, and does not cut off a high-frequency signal with a frequency higher than the frequency of the first power, and
communicates with the external communication apparatus by transmitting the high-frequency signal via the filter and the power line.

(7)
The control apparatus according to any one of (1) to (6), wherein the control target apparatus is a lighting apparatus.

(8)
A control method including:
a step of determining whether a control target apparatus drivable with first power supplied from an external power supply and second power supplied from a battery is driven with the second power, on the basis of a supply state of the first power and a transmission signal acquired via a power line from an external communication apparatus connected to the power line through which the first power is transmitted; and
a step of driving the control target apparatus with the second power when the control target apparatus is determined to be driven with the second power.

(9)
A program causing a computer to perform:
a step of determining whether a control target apparatus drivable with first power supplied from an external power supply and second power supplied from a battery is driven with the second power, on the basis of a supply state of the first power and a transmission signal acquired via a power line from an external communication apparatus connected to the power line through which the first power is transmitted; and
a step of driving the control target apparatus with the second power when the control target apparatus is determined to be driven with the second power.

REFERENCE SIGNS LIST 20, 400 switching apparatus
30, 300, 300A, 300B, 300C battery
100, 100A, 100B, 100C control apparatus
102, 404 communication unit
104 control unit
110 determination unit
112 target control unit
200, 200A, 200B, 200C control target apparatus
402, 500, 500A, 500B, 500C, 500D, 500E, 500F filter
600A, 600B, 600C communication apparatus
700 management apparatus
1000, 2000, 3000 control system

The invention claimed is:

1. A control apparatus configured to switch a control target apparatus between an external power supply and a battery, the apparatus comprising:
a determination unit configured to determine whether to drive the control target apparatus with one of first power supplied from the external power supply and second power supplied from the battery, wherein the determination is made in response to a supply state of the first power and a transmission signal acquired via a power line from an external communication apparatus connected to the power line through which the first power is transmitted,
wherein, when the first power is supplied to the control target apparatus, the determination unit does not determine to drive the control target apparatus with the second power, and
wherein, when the first power is not supplied to the control target apparatus, the determination unit determines whether to drive the control target apparatus with the second power on the basis of a state of the transmission signal; and
a target control unit, responsive to the determination unit, configured to switch from driving the control target apparatus with the first power to driving the control target apparatus with the second power in response to a signal from the determination unit indicating a determination to drive the control target apparatus with the second power;

wherein the transmission signal includes identification information that uniquely identifies the external communication apparatus connected to the power line from among a plurality of communication apparatuses configured to be connected to the power line and includes information specifying the status of the first power supplied from the external power supply.

2. The control apparatus according to claim 1,
wherein, when the first power is not supplied to the control target apparatus and the transmission signal is acquired, the determination unit determines to drive the control target apparatus with the second power, and
wherein, when the first power is not supplied to the control target apparatus and the transmission signal is not acquired, the determination unit does not determine to drive the control target apparatus with the second power.

3. The control apparatus according to claim 1, further comprising:
a communication unit configured to communicate with the external communication apparatus via the power line,
wherein the determination unit acquires the transmission signal from the external communication apparatus by causing the communication unit to communicate with the external communication apparatus.

4. The control apparatus according to claim 3,
wherein the communication unit
transmits, to the external communication apparatus, a signal causing the transmission signal to be transmitted, and
receives the transmission signal transmitted in such a manner that load modulation is performed based on the received signal in the external communication apparatus.

5. The control apparatus according to claim 3,
wherein the communication unit
is connected to a filter that is connected to the power line, cuts off at least a signal with a frequency of the first power, and does not cut off a high-frequency signal with a frequency higher than the frequency of the first power, and
communicates with the external communication apparatus by transmitting the high-frequency signal via the filter and the power line.

6. The control apparatus according to claim 1, wherein the control target apparatus is a lighting apparatus.

7. A method of switching a control target apparatus between an external power supply and a battery, the method comprising:
a step of determining whether to drive the control target apparatus with one of first power supplied from the external power supply and second power supplied from the battery, wherein the determination is made on the basis of a supply state of the first power and a transmission signal acquired via a power line from an external communication apparatus connected to the power line through which the first power is transmitted,
wherein, when the first power is supplied to the control target apparatus, the control target apparatus is not determined to be driven with the second power, and
wherein, when the first power is not supplied to the control target apparatus, the control target apparatus is determined to be driven with the second power on the basis of a state of the transmission signal; and
a step of switching from driving the control target apparatus with the first power to driving the control target apparatus with the second power, in response to the step of determining, when the control target apparatus is determined to be driven with the second power;
wherein the transmission signal includes identification information that uniquely identifies the external communication apparatus connected to the power line from among a plurality of communication apparatuses configured to be connected to the power line and includes information specifying the status of the first power supplied from the external power supply.

8. A non-transitory computer readable storage medium having computer executable instructions stored thereon that, when executed, cause a computer to perform:
a step of determining whether to drive a control target apparatus with one of first power supplied from an external power supply and second power supplied from a battery, wherein the determination is made on the basis of a supply state of the first power and a transmission signal acquired via a power line from an external communication apparatus connected to the power line through which the first power is transmitted,
wherein, when the first power is supplied to the control target apparatus, the control target apparatus is not determined to be driven with the second power, and
wherein, when the first power is not supplied to the control target apparatus, the control target apparatus is determined to be driven with the second power on the basis of a state of the transmission signal; and
a step of switching from driving the control target apparatus with the first power to driving the control target apparatus with the second power, in response to the step of determining, when the control target apparatus is determined to be driven with the second power;
wherein the transmission signal includes identification information that uniquely identifies the external communication apparatus connected to the power line from among a plurality of communication apparatuses configured to be connected to the power line and includes information specifying the status of the first power supplied from the external power supply.

9. The control apparatus according to claim 1, wherein the status of the first power supplied from the external power supply indicates the state of a switch.

* * * * *